United States Patent
Frank et al.

(10) Patent No.: US 6,536,224 B2
(45) Date of Patent: Mar. 25, 2003

(54) FROZEN BEVERAGE MACHINE

(75) Inventors: Jimmy I. Frank, Houston, TX (US); Thomas L. Guy, III, San Antonio, TX (US)

(73) Assignee: Lancer FBD, Houston, TX (US)

( * ) Notice: Subject to any disclaimer, the term of this patent is extended or adjusted under 35 U.S.C. 154(b) by 0 days.

(21) Appl. No.: 09/932,454

(22) Filed: Aug. 18, 2001

(65) Prior Publication Data

US 2002/0043071 A1 Apr. 18, 2002

Related U.S. Application Data

(60) Provisional application No. 60/226,228, filed on Aug. 18, 2000.

(51) Int. Cl.⁷ .................................................. A23G 9/00
(52) U.S. Cl. ......................... 62/303; 62/342; 251/253; 251/254; 251/351
(58) Field of Search .................. 62/342, 343, 303; 251/253, 254, 351, 353

(56) References Cited

U.S. PATENT DOCUMENTS

| | | | |
|---|---|---|---|
| 1,846,446 A | * 2/1932 | Maynard et al. | 184/48.1 |
| 3,062,021 A | * 11/1962 | Gorse | 62/342 |
| 3,295,997 A | 1/1967 | Tomlinson et al. | 99/275 |
| 3,464,220 A | * 9/1969 | Phelan | 165/169 |
| 3,797,268 A | * 3/1974 | Garavelli | 62/258 |
| 4,058,383 A | * 11/1977 | Peterson | 222/148 |
| 4,201,558 A | * 5/1980 | Schwitters et al. | 137/594 |
| 4,703,628 A | * 11/1987 | Togashi et al. | 222/55 |
| 4,747,272 A | 5/1988 | Howell et al. | 62/136 |
| 4,848,381 A | 7/1989 | Livingston et al. | 134/57 R |
| 5,016,446 A | * 5/1991 | Fiedler | 222/146.6 |
| 5,024,066 A | * 6/1991 | Goavec | 366/292 |
| 5,095,710 A | 3/1992 | Black et al. | 62/68 |
| 5,121,855 A | 6/1992 | Credle, Jr. | 222/129.2 |
| 5,295,807 A | 3/1994 | Willey et al. | 417/274 |
| 5,410,888 A | * 5/1995 | Kaiser et al. | 251/30.01 |
| 5,706,661 A | 1/1998 | Frank | 62/70 |
| 5,743,097 A | * 4/1998 | Frank | 62/136 |
| 5,799,726 A | 9/1998 | Frank | 165/156 |
| 5,806,550 A | 9/1998 | Frank | 137/7 |
| 6,126,983 A | 10/2000 | Miller | 426/565 |

FOREIGN PATENT DOCUMENTS

| | | |
|---|---|---|
| GB | 2181068 A | 4/1987 |
| JP | 11235154 | 8/1999 |
| JP | 11253107 | 9/1999 |
| JP | 2000-224959 | 8/2000 |

* cited by examiner

Primary Examiner—William E. Tapolcai
(74) Attorney, Agent, or Firm—Howrey Simon Arnold & White

(57) ABSTRACT

A frozen beverage machine includes a process control block having a plurality of inlets for receiving ingredients and a plurality of outlets. A mixing block has a plurality of inlets connected to the process control block outlets such that ingredients flowing through the mixing block are mixed together therein. At least one freezing chamber is connected to the mixing block outlet to receive the mixed ingredients therefrom, and a refrigeration system is arranged to refrigerate the freezing chamber. A dispensing valve and a drain valve are connected to the freezing chamber. A controller is connected to the process control block to control operation of the frozen beverage machine. The beverage machine includes an automated sanitizing system operated by the controller, in which the beverage mixture is drained from the freezing chamber via the drain valve, and a cleaning solution is pumped into a cleaning solution inlet of the mixing block and into the freezing chamber to sanitize the machine. The cleaning solution is then drained from the freezing chamber via the drain valve.

31 Claims, 26 Drawing Sheets

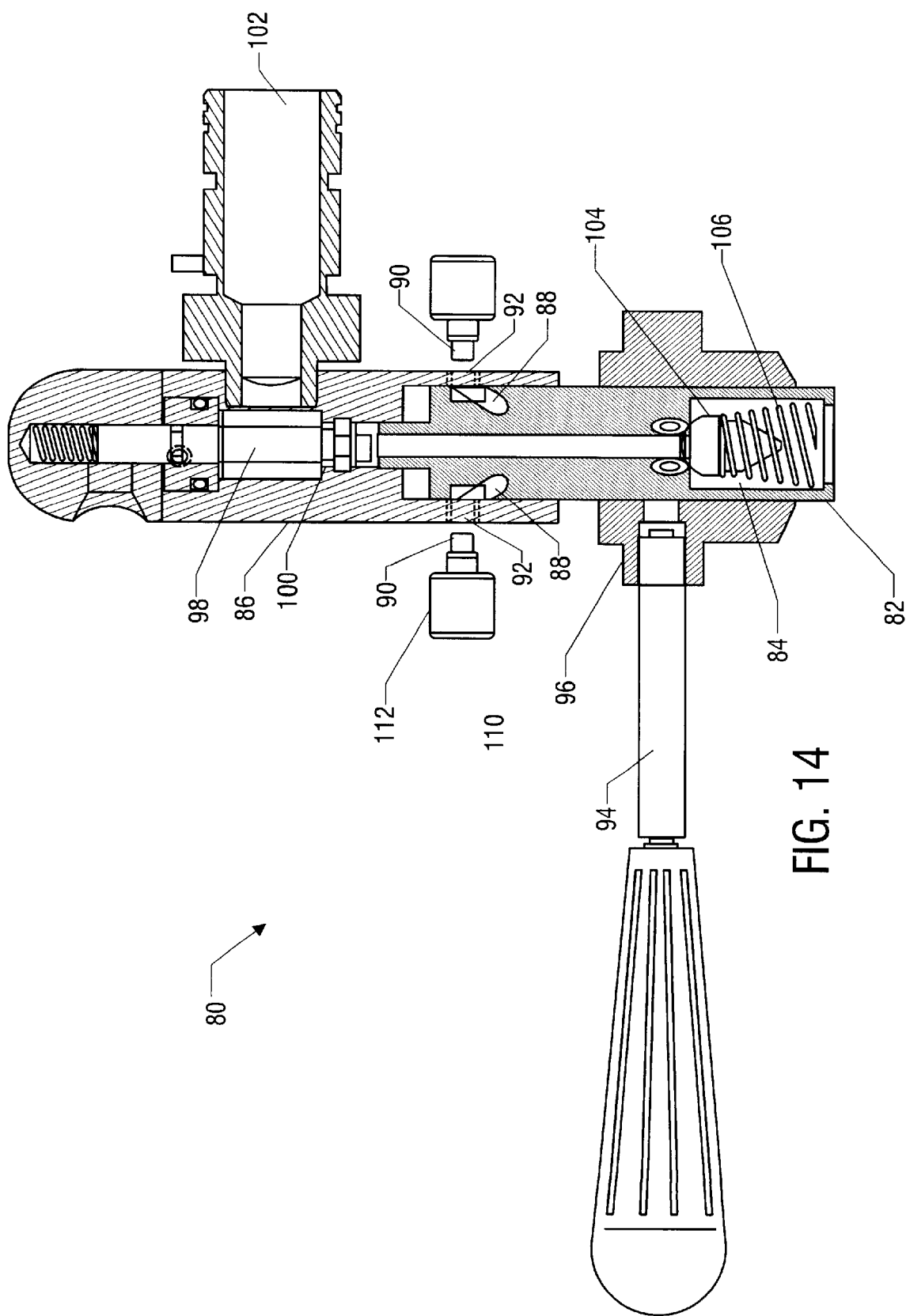

FROZEN BEVERAGE MACHINE

CROSS REFERENCE TO RELATED APPLICATION

This application claims the benefit of U.S. Provisional Patent Application Serial No. 60/226,228, filed on Aug. 18, 2000, the entire specification of which is incorporated by reference herein.

BACKGROUND OF THE INVENTION

1. Field of the Invention

The invention relates generally to beverage machines, and more particularly, to devices and methods for producing and dispensing products that are susceptible to growth of microbiological organisms.

2. Description of Related Art

Systems for producing beverages, such as frozen carbonated beverage machines, are well known in the art. These devices produce a frozen beverage by freezing a mixture of ingredients such as syrup, water and carbon dioxide in a mixing, or freezing, chamber. The mixture freezes on the inner surface of the refrigerated mixing chamber. Typically, the mixing chamber is surrounded by a helical coil through which a refrigerant passes. A beater is disposed inside the chamber, which includes a rotating shaft having a plurality of outwardly-projecting blades that scrape the mixture off the inside wall of the mixing chamber. Once the beverage is in the desired frozen state, the product is dispensed from the chamber through a product dispensing valve.

Frozen beverage machines referred to as "open hopper" or "open bowl" design machines are typically used to dispense low acid frozen beverages—having a pH level that supports potential growth of micro organisms. The product is poured from a previously sealed or refrigerated package directly into the hoppers, which are also refrigerated. In so doing, any contaminants that are introduced will have their growth retarded by the low temperatures. This is similar to placing milk in a refrigerator.

While these existing machines can retard the growth of contaminants, the contaminants do continue to grow and the hoppers are exposed to air-borne contaminates, so the machines must be sanitized on a periodic basis. This typically requires the machines to be disassembled on a daily or frequent basis and cleaned with sanitizing solution. A more extensive cleaning may be required on a weekly or less frequent basis. Some machines that are open hopper design have a heating process built in that raises the product contained in the hopper to an elevated temperature in order to pasteurize the product and reduce the contaminant level. This is somewhat effective, but has a negative effect on the quality of the product to be dispensed. Also, the unit must be removed from service on a relatively frequent basis and disassembled and sanitized. Moreover, the reliability of the disassembly and cleaning process is often low due, as unskilled and under-trained individuals are often required to complete this process.

The present invention addresses shortcomings of the prior art.

SUMMARY OF THE INVENTION

The present invention addresses some of these issues associated with the prior art and significantly reduces the contamination exposure and subsequent growth of contaminants by the provision of a sealed machine with a sealed delivery system. It will minimize any exposure to contaminants while keeping the mixture refrigerated in order to retard growth of any small amounts of contaminants that may enter the sealed system.

The system and methods according to the present invention are particularly suited in processing beverages that are subject to microbiological contamination and growth, such as milk products or other protein based beverages or simple sugar based beverages. Further, while the present invention is disclosed primarily in terms of frozen beverages, it is applicable to any containerized or flow system.

In one embodiment of the invention, a completely sealed unit (though the invention is also applicable to non-sealed units) relies on keeping contaminants from entering the system and keeping any syrup mixtures that are susceptible to rapid bacteriological growth chilled so that growth is significantly retarded. This reduces the frequency of sanitizing required. Since the system is sealed, the sanitizing can occur without the time consuming and inconsistent disassembly that must occur on open hopper machines. An automated, on-board sanitation system that is computer controlled is provided that is activated, for example, in response to an operator's action such as activating a button, or upon predetermined criteria such as the passage of a certain time period.

In some embodiments, sanitizing additionally occurs by a similar process used for producing frozen beverages. A bag or container of sanitizing solution is attached to the machine in much the same way the syrup mixture is attached and the sanitizing solution is pumped throughout the delivery and freezing areas sanitizing all surfaces contacted by the potentially contaminated syrup solution.

In accordance with aspects of the present invention, a frozen beverage machine includes a process control block having a plurality of inlets for receiving ingredients and a plurality of outlets. A mixing block has a plurality of inlets connected to the process control block outlets such that ingredients flowing through the mixing block are mixed together therein. At least one freezing chamber is connected to the mixing block outlet to receive the mixed ingredients therefrom, and a refrigeration system is arranged to refrigerate the freezing chamber. In some embodiments, the mixing block directly contacts the freezing chamber and is chilled through such contact. In other embodiments, the mixing block is situated remotely from the freezing chamber and chilled independently. A controller, which typically includes a microprocessor and associated memory, is connected to the process control block and is operable to control operation of the frozen beverage machine. A dispensing valve is connected to the freezing chamber to dispense product from the freezing chamber.

In addition to controlling the operation of the frozen beverage machine to produce beverage products, the controller is programmed to sanitize the frozen beverage machine in an automated fashion. At least one of the mixing block inlets is connected to a source of cleaning fluid, which may be contained in the frozen beverage machine or external thereto. The product mixture is drained from the freezing chamber via a drain valve, and the cleaning solution is pumped into the cleaning solution inlet of the mixing block and into the freezing chamber. After the machine is sanitized, the cleaning solution is drained from the freezing chamber via the drain valve. The draining of product mixture or cleaning solution may be accomplished, for example, by pressurizing the freezing chamber and opening the drain valve, and/or by pumping the materials from the freezing chamber through the drain valve.

BRIEF DESCRIPTION OF THE DRAWINGS

Other objects and advantages of the invention will become apparent upon reading the following detailed description and upon reference to the drawings in which:

FIG. 14 is a side view schematically illustrating a dispensing valve used with embodiments of the frozen beverage machine of the present invention.

Figure 1:
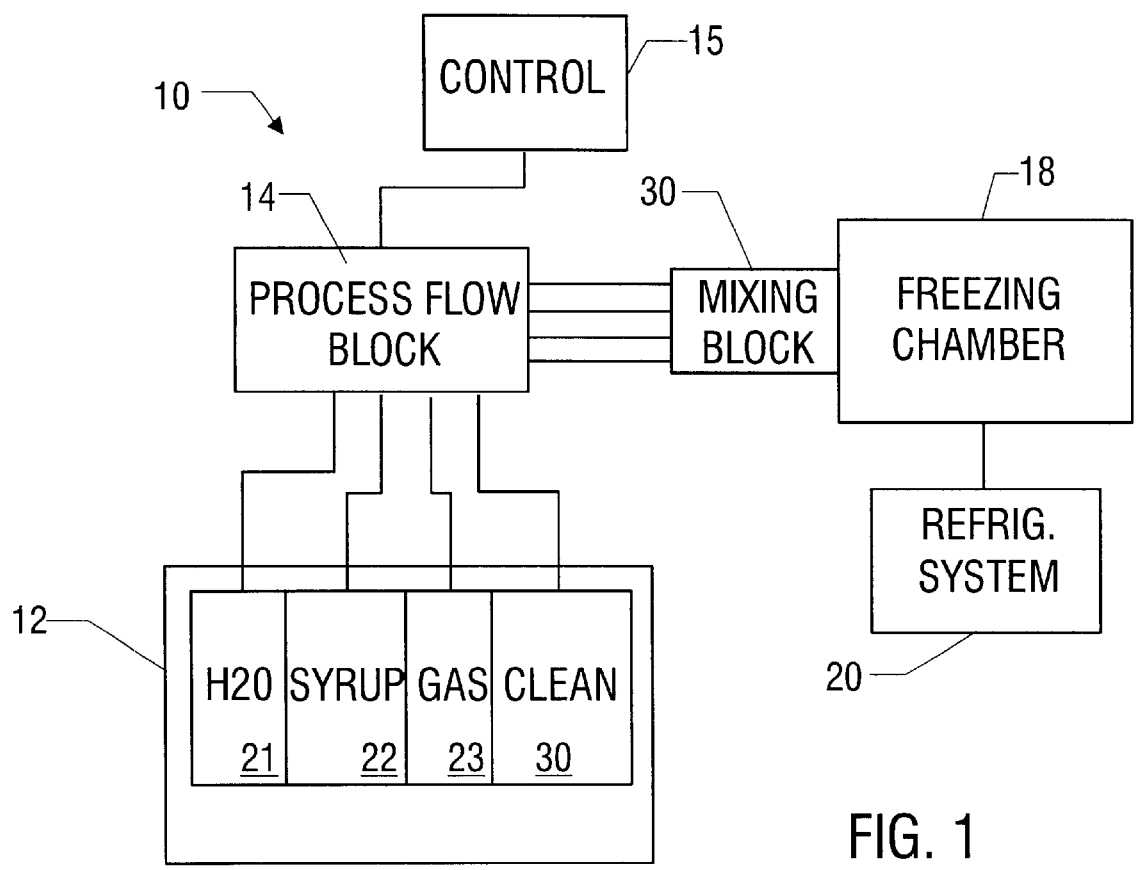
FIG. 1 is a block diagram schematically illustrating a frozen beverage machine in accordance with aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The invention of this disclosure provides modifications and improvements to frozen beverage machines, such as the machines and systems disclosed in U.S. Pat. Nos. 5,706,661; 5,743,097; 5,799,726; and 5,806,550 by J. I. Frank. The entire disclosures of these patents are incorporated by reference herein.

FIG. 1 is a simplified block diagram schematically illustrating components of a typical frozen beverage machine 10. The frozen beverage machine 10 includes an ingredients supply source 12, a process flow block 14, a controller 16, at least one freezing chamber 18 and a refrigeration system 20. The ingredient supply source 12 may include, for example, a water supply 21, syrup supply 22 and a gas supply 23. The frozen beverage machine 10 further includes a mixing block 30 connected to the freezing chamber 18.

Ingredients for a frozen beverage mixture are provided from the ingredient supply 12 to the process flow block 14, which controls the flow of the ingredients into the mixing block 30 and freezing chamber 18 as directed by the controller 16. The controller 16 may comprise an appropriately programmed microprocessor and suitable memory devices. The operation of the controller 16 and other control instrumentation is described, for example, in U.S. Pat. No. 5,706,661 incorporated by reference above.

Figure 2:
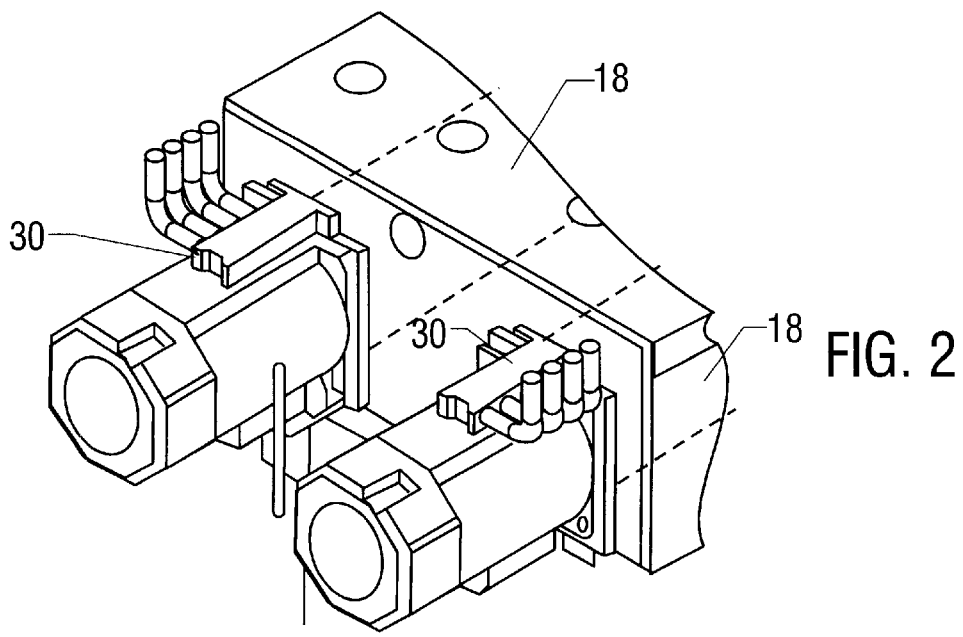
FIG. 2 is a partial perspective view of a frozen beverage machine in accordance with an exemplary embodiment of the invention, showing the placement of a mixing block relative to a freeze pack.

The mixing block 30 as designed in an exemplary embodiment is directly attached to the freezing chamber 18 and is chilled by conductive and/or convective heat transfer. FIG. 2 illustrates an exemplary freezing chamber/mixing block arrangement, showing two mixing blocks 30 directly attached to corresponding freezing chambers 18 to accomplish the heat transfer. In alternative arrangements, the mixing block 30 and process lines are chilled by other means and thus may be mounted remotely from the freezing is chamber 18. The mixing block 30 is the point at which a mixture of syrup, water and gas can be mixed and kept chilled prior to entering the freezing chamber 18. The gas or air may be injected at the mixing block 30 to cause "overrun," or to produce a beverage with a defined content of air or gas to enhance flavor and texture and to improve economics and reduce finished drink cost.

The mixing block 30 of the present invention performs several functions that were accomplished in the process flow block of prior art frozen beverage machines. For example, product ingredients such as water and syrup combine in the mixing block to begin the transformation into a water/syrup mixture.

Figure 3A:
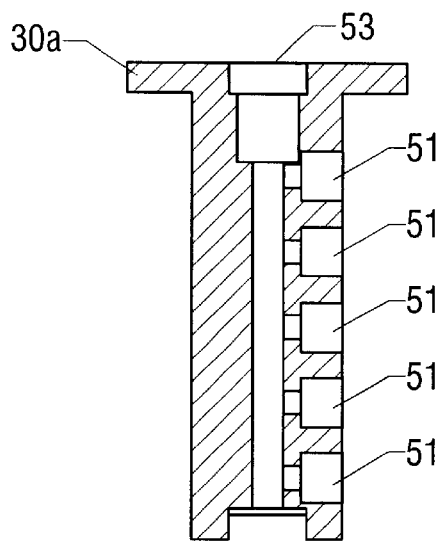
FIG. 3A is a sectional view of a mixing block in accordance with an embodiment of the invention.
Figure 4:
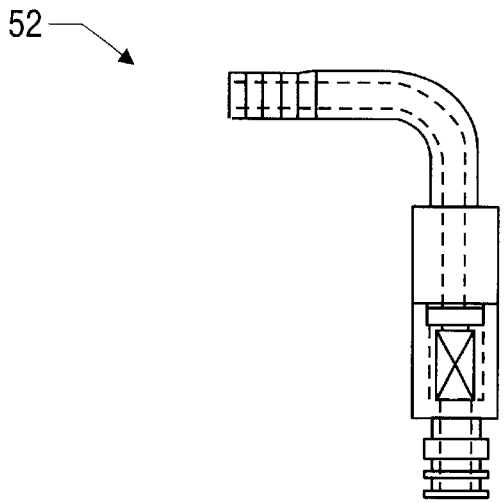
FIG. 4 is a schematic view of a check valve in accordance with an embodiment of the invention.

FIG. 3A shows another embodiment of a mixing block 30a. The mixing block 30a includes a plurality of inlets 51 for receiving ingredients and an outlet 53. The s particular mixing block 30b shown in FIG. 3A includes five inlets 51 for receiving beverage ingredients, such as syrup, a gas such as air or carbon dioxide and water. Additionally, the remaining inlets 51 are for connection to one or more cleaning solutions, such as detergent and/or a sanitizing agent. FIG. 4 schematically illustrates a check valve assembly 52 that may be connected to the inlets 51, other check valves may be added to eliminate any stagnant zones.

Figure 3B:
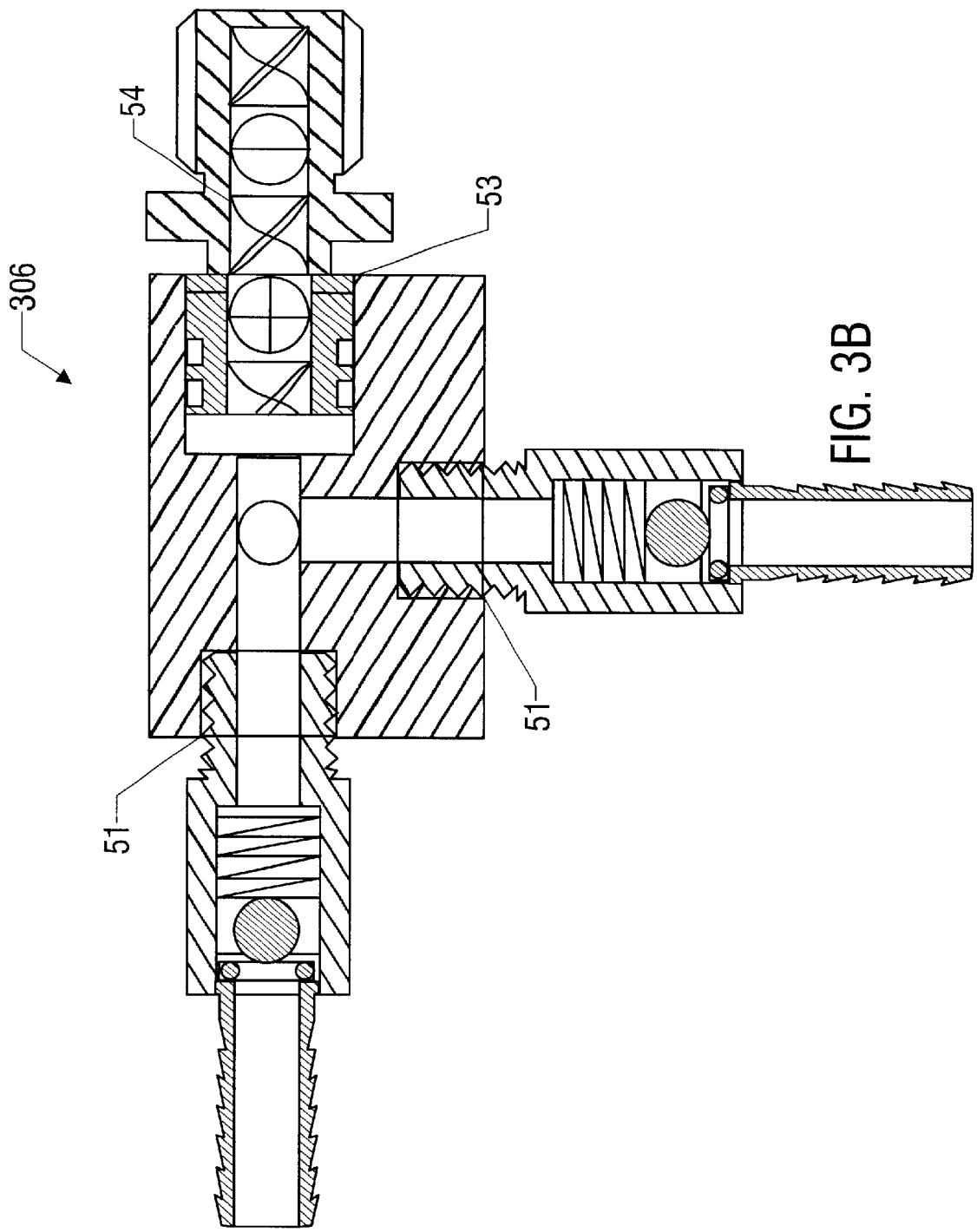
FIG. 3B is a sectional view of a mixing block in accordance with another embodiment of the invention.

FIG. 3B is a sectional view illustrating an alternative embodiment of a mixing block 30b in accordance with the present invention. The exemplary mixing block 30b includes two inlets 52 in fluid communication with an outlet 53. Each inlet 52 has a check valve coupled thereto for receiving product ingredients, such as syrup and water. As noted above, ingredients combine in the mixing block 30b prior to entering the freezing chamber 18. In the particular embodiment illustrated in FIG. 3B, a static mixer 54 is coupled to the outlet 53 to further mix the ingredients received through the inlets 52. The static mixer 54 is attached to a freezing chamber, to provide the chilled mixture of ingredients.

Figure 5A:
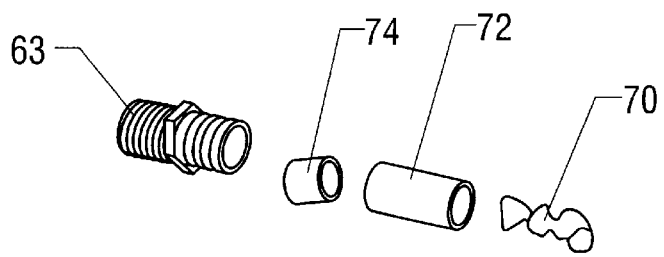
FIGS. 5A–5C illustrate a static mixer in accordance with an embodiment of the invention.
Figure 5B:
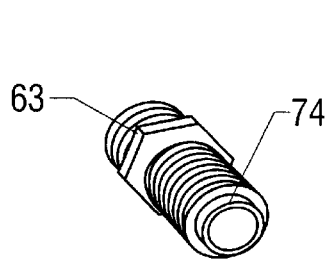
Figure 5C:
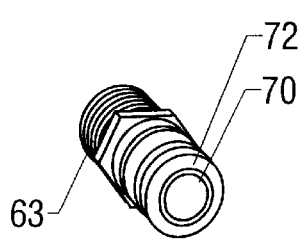

FIGS. 5A–5C illustrate a static mixer assembly 63 in accordance with aspects of the present invention. As shown in the exploded view of FIG. 5A, the mixer assembly 63 includes a static mixer 70, a tube 72, and a diffuser 74 that fits inside the tube 72. FIGS. 5B and 5C illustrate opposite views of the diffuser 63 showing the diffuser 74 projecting from one end of the mixer assembly 63 (FIG. 5B) and the static mixer 70 at the other end of the mixer assembly 63 (FIG. 5C).

Aspects of the present invention provide an improved sanitation process. When sanitation is performed, it can be completed on a sealed system in an entirely automated fashion, without disassembly, cleaning all elements of the chilled, sealed mixing block 30 and freezing chamber 18. Accordingly, fluid sources in addition to those required for producing beverage products have been provided. Referring back to FIG. 1, the ingredient supply 12 may also include one or more cleaning solutions 80, such as a sanitizer and/or a detergent. In one embodiment of the invention, a phosphoric acid-based cleaning solution is used. The syrup 22 and the cleaning solution 80 may be contained in respective bags situated in a box. The desired ingredients are then pumped using a product pump from the bag to the frozen beverage machine 10. When the bag is emptied, it is disconnected from the pump and disposed of.

In certain embodiments, the disposable syrup concentrate container may include a disposable product pump that delivers syrup to the freezing chamber. The pump in this approach is designed as a "throw away" pump that is disposed of when the used syrup container is disposed of, further eliminating sources of contamination and simplifying the sanitation process.

Figure 6A:
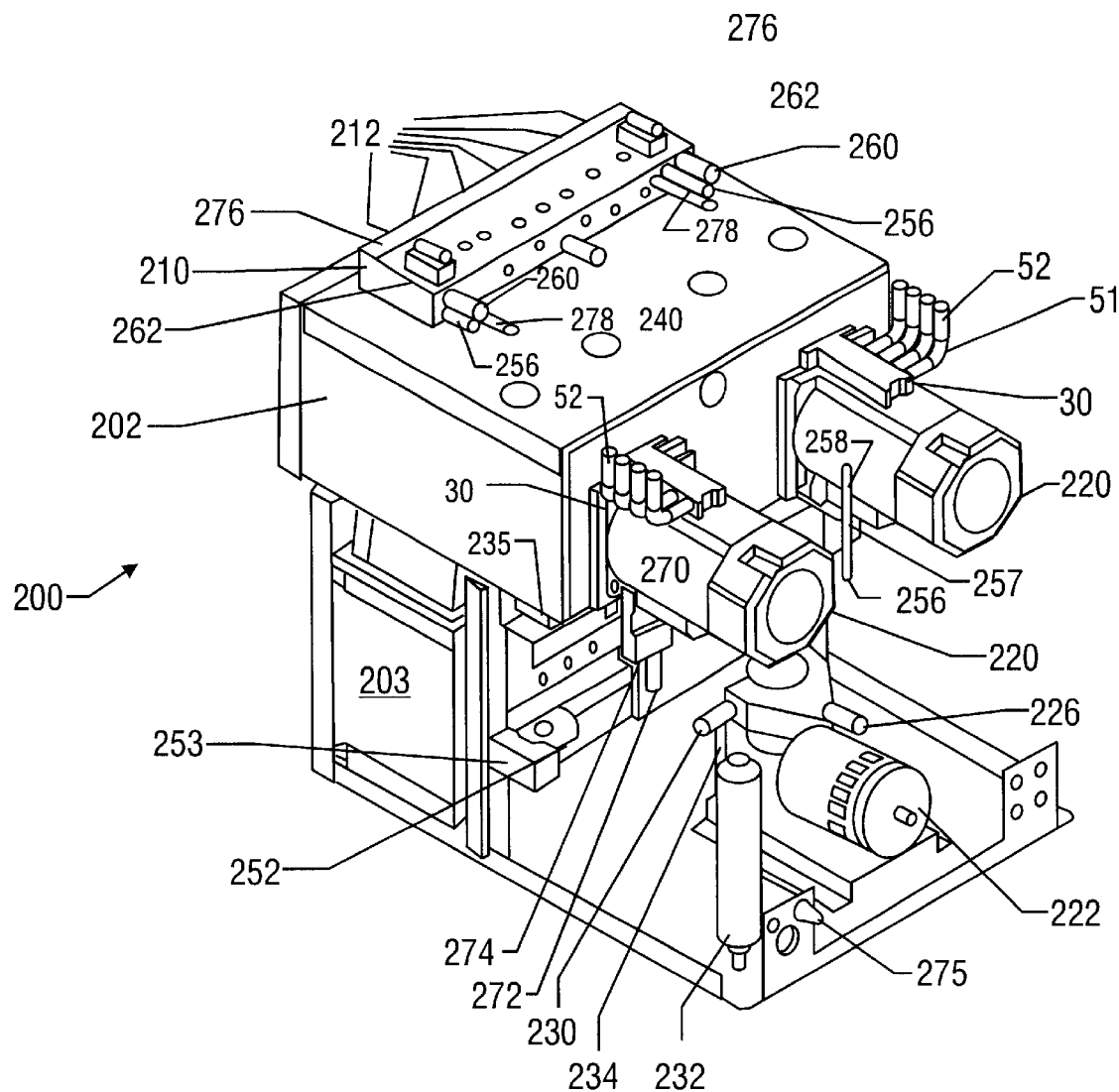
FIGS. 6A–6C are rear perspective, side and front views illustrating portions of a frozen beverage machine in accordance with the present invention.
Figure 6B:
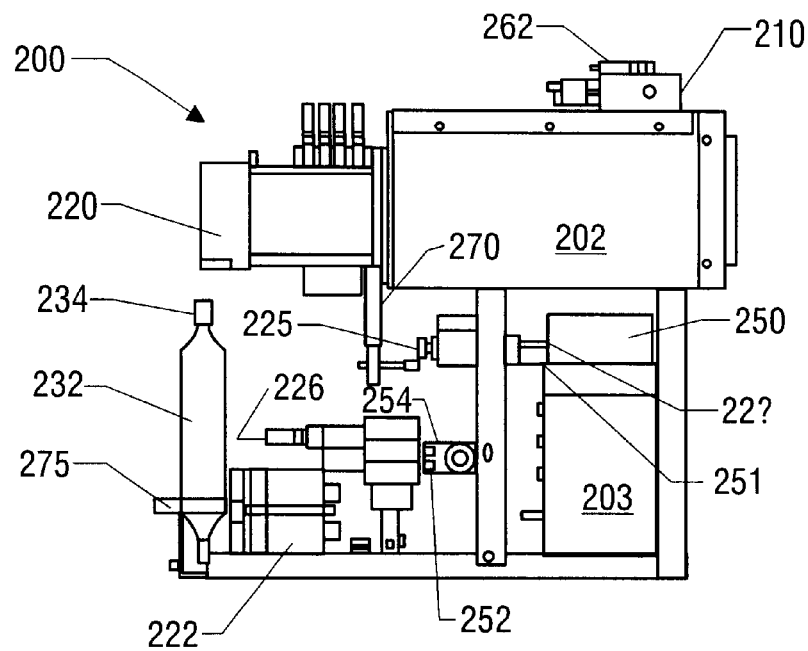
Figure 6C:
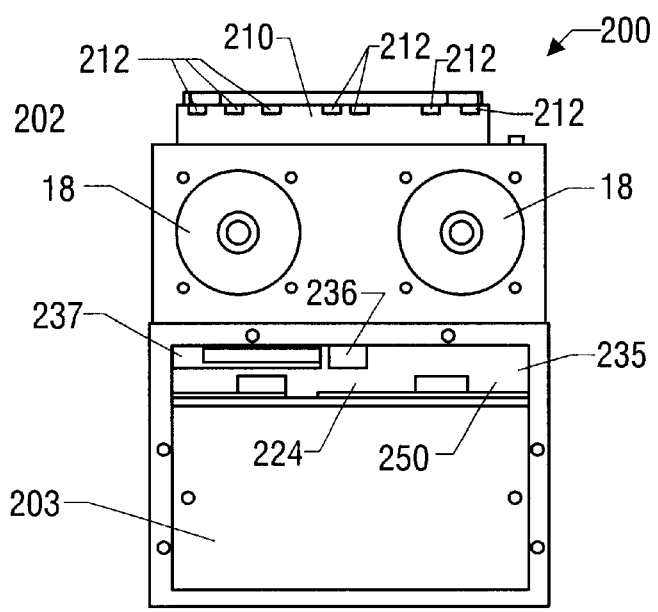
Figure 7:
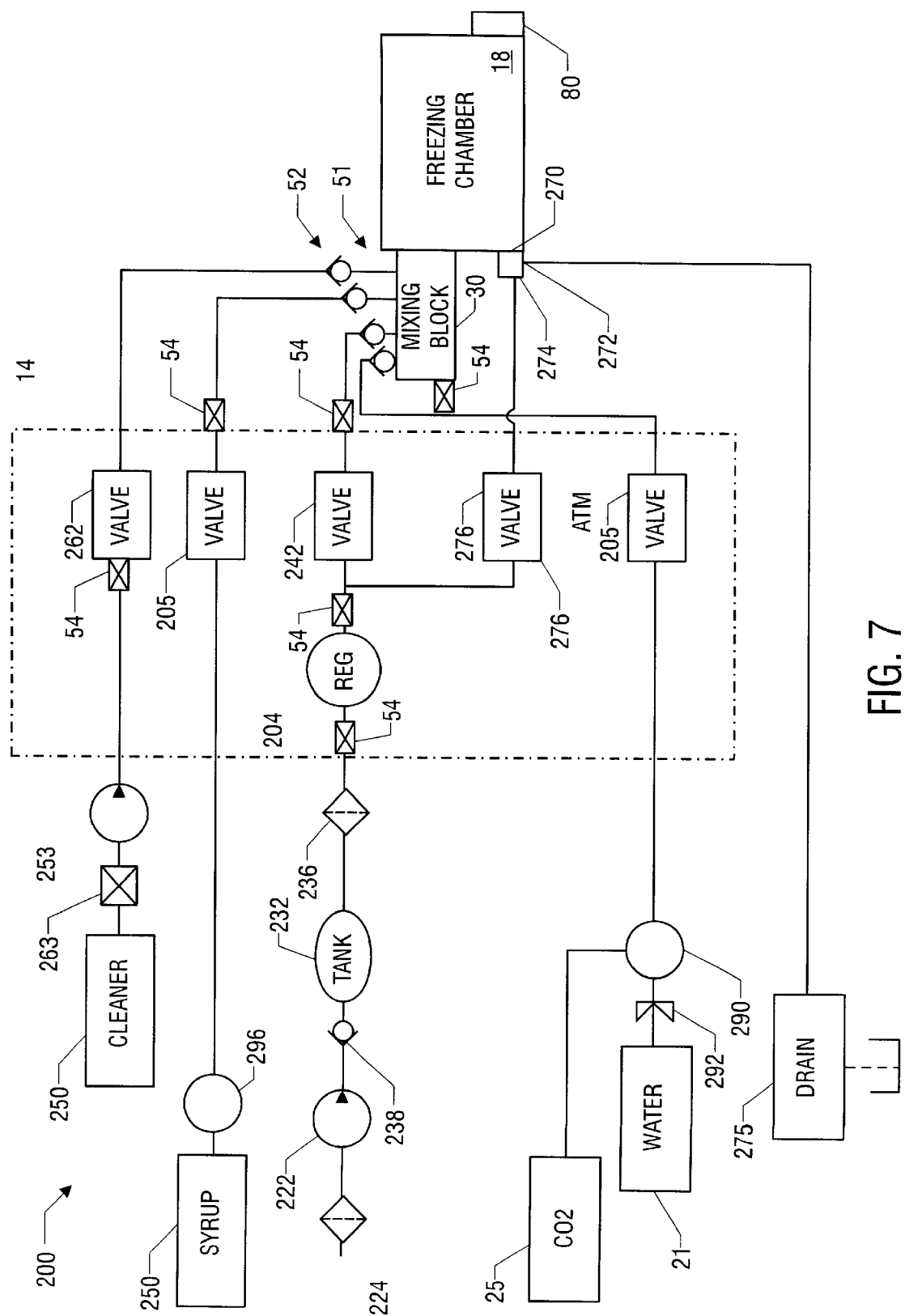
FIG. 7 is a schematic view of portions a frozen beverage machine in accordance with the invention.

FIGS. 6A–6C are rear perspective, side, and rear views illustrating portions of one particular embodiment of a frozen beverage machine 200 in accordance with the present invention. The frozen beverage machine 200 is shown with its outer cabinet removed in FIGS. 6A–6C. Further, some of the lines connecting various component outlets and inlets are not shown in FIGS. 6A–6C for simplicity. FIG. 7 is a block diagram schematically illustrating one of the freezing chambers 18 of the frozen beverage machine 200 and some associated components.

The machine 200 includes a freeze pack assembly 202 that includes first and second freezing chambers 18, to which corresponding first and second mixing blocks 30 are coupled. The mixing blocks 30 include a plurality of inlets 51 which, for example, may supply syrup, water, gas such as air or carbon dioxide, and one or more cleaning solutions. An electrical box 203 is situated below the freeze pack 202 for housing various electrical components of the beverage machine 200. The inlets 51 have check valves 52 attached thereto for preventing backwards flow of the ingredients. Further, the check valves 52 maintain freezing chamber separation from incoming streams. The check valves 52 are situated such that the exposed areas are also cleaned during sanitation of the system (described further below). A dispensing valve 80 is connected to the freezing chamber 18 for dispensing the beverage from the machine.

A pressure transducer 54 may be provided on the mixing block 30 to sense pressure in the freezing chamber 18. In certain embodiments of the invention, the monitored pressure is used to control fluid flow and gas injection rates into the freezing chamber 18. The mixing block 30 is made of a suitable material such as stainless steel, though the use of other materials, such as plastic, is contemplated. The mixing block 30 is bolted directly to the freezing chamber 18. Due to this direct connection, the freezing chamber 18 communicates thermally with the mixing block 30 and the mixture inside. Thus, the mixing block 30 and the entrained mixture approach a temperature that is equal to or slightly greater than the temperature of the freezing chamber 18. This prevents spoilage and growth of microorganisms in the mixture before it enters the freezing chamber 18, which is especially important when the ingredients mixture includes dairy ingredients.

Figure 8:
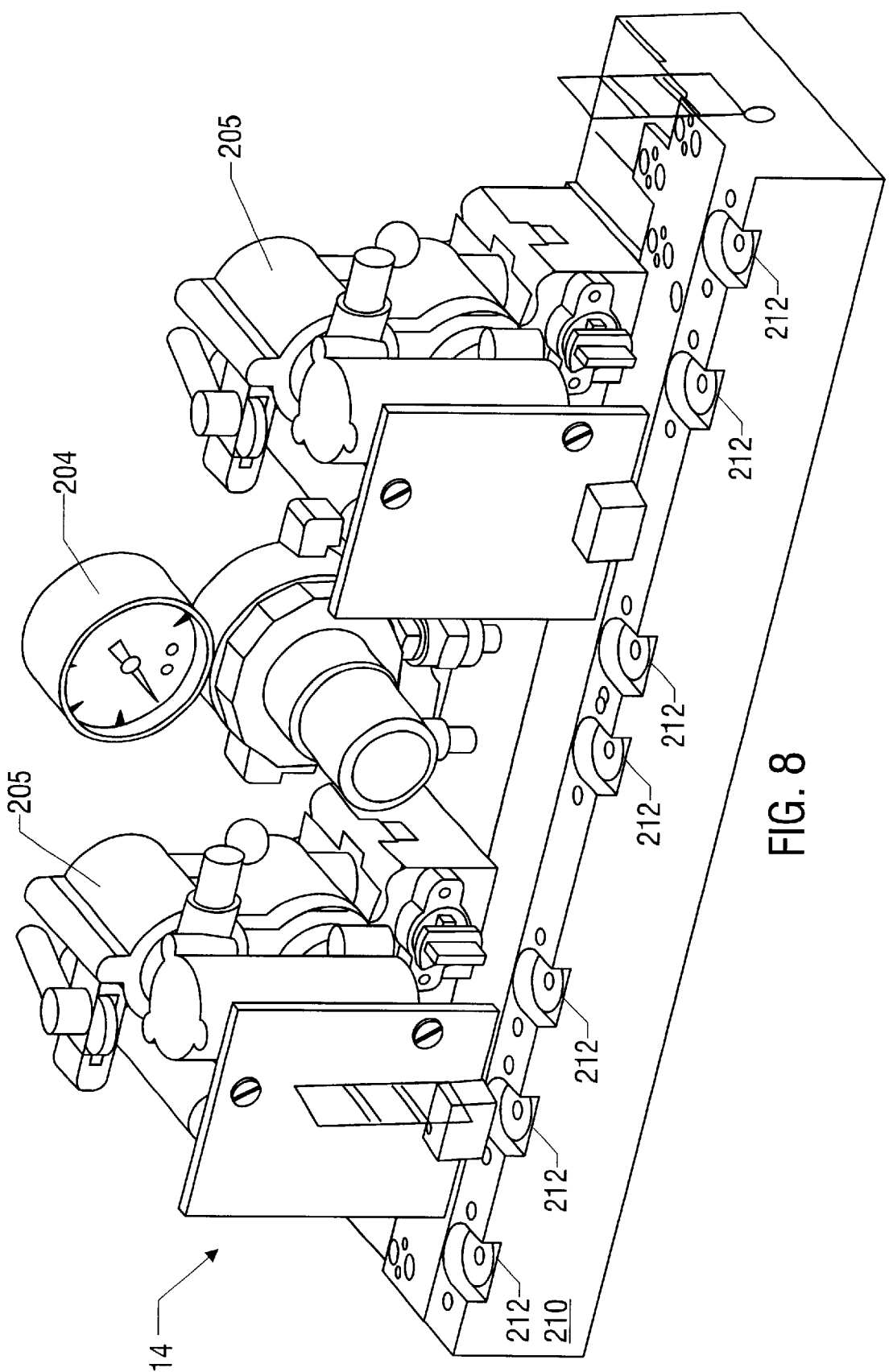
FIG. 8 is a perspective view of a process control block in accordance with the present invention.

A header block 210, which is part of the process flow block 14, is situated on top of the freeze pack 202. FIG. 8 illustrates an embodiment of the process flow block in a perspective view. The flow block 14 is similar to that disclosed and described in U.S. Pat. No. 5,806,550 incorporated by reference, so it is not addressed in detail herein. The flow block 14 shown in FIG. 8, however, does not include a secondary flow block or check valves in the ingredient inlets, as described in U.S. Pat. No. 5,806,550, since these elements are incorporated into the mixing block 30. The header block 210 of the process flow block 14 includes a plurality of inlets 212 for receiving ingredients. An air regulator 204 is connected to the header block and flow control devices 205 are provided to control the mixture and flow of the beverage ingredients through the beverage machine 200.

In the illustrated embodiment, each of the flow control devices 205 has a syrup module and a water module that receive and control the flow of syrup and water to achieve the desired ratios thereof. In an exemplary embodiment, volumetric flow control devices such as those described in U.S. Pat. No. 5,121,855 are used, though any suitable manual flow control devices or electronic flow control devices that provide a suitable output may be used. Use of volumetric flow control devices as illustrated enables an operator to adjust the syrup to water ratio via the electronic control panel of the beverage machine, as the flow control devices are connected to the controller 16. With other types of flow control devices, the ratio may be manually controlled.

Beater motor assemblies 220 are connected to the freeze pack 202 to drive the beaters situated within the freezing chambers 18. An air compressor 222 is situated below the beater motor assemblies 220. An incoming compressor sock filter 224 has an outlet 225 connected to the inlet 226 of the air compressor 222. An outlet 230 of the air compressor 222 is connected to the inlet of an air holding tank 232, which has an outlet 234 connected to the inlet 235 of an in-line air filter 236. The in-line air filter 236 further includes an outlet 237 that is connected to the air inlet 240 of the header block 210. The process flow block 14 includes an air regulator 204 that receives air from the in-line filter 236. The output of the regulator 204 is connected to the appropriate inlet 51 of the mixing block 30 via a valve 242. Pressure transducers 54 are situated on either side of the pressure regulator 204.

A cleaner package 250 is situated below the freezer pack 202, which may comprise a bag containing the desired cleaning and sanitizing solution situated in a box. The cleaner package 250 provides a source of cleaning solution for sanitizing the beverage machine 200. Additional cleaner packages 250 may be provided. For example, a separate cleaner package 250 could be provided for each freezing chamber 18, or a first cleaner package could contain a detergent for cleaning the beverage machine lines and components, and a second cleaner package could contain a bleach solution for sanitizing the machine 200. When the cleaner package 250 is empty, it is simply replaced with another package. The cleaner package 250 includes an outlet 251 connected to the inlet 252 of a sanitation pump 253. Each freezing chamber 18 may have a sanitation pump 253 associated therewith, or a single sanitation pump 253 may be used to pump solution to the desired freezing chamber 18 controlled, for example, by appropriate valve arrangments. The sanitation pump 253 further includes an outlet 254 connected to the inlet 256 of a tee connector 257. The tee connector 257 has outlets 258 connected to sanitation inlets 259 of the header block 210. Cleaning solution flows from the sanitation inlets 259 to corresponding outlets 260 via a pressure transducer 54 and sanitation valves 262. The outlets 260 are connected to the appropriate inlets 52 of the mixing block 30. A connector 263 is provided between the sanitation pump 253 and the cleaner package 250 for connecting and disconnecting the "throw-away" cleaner package 250.

Figure 9B:
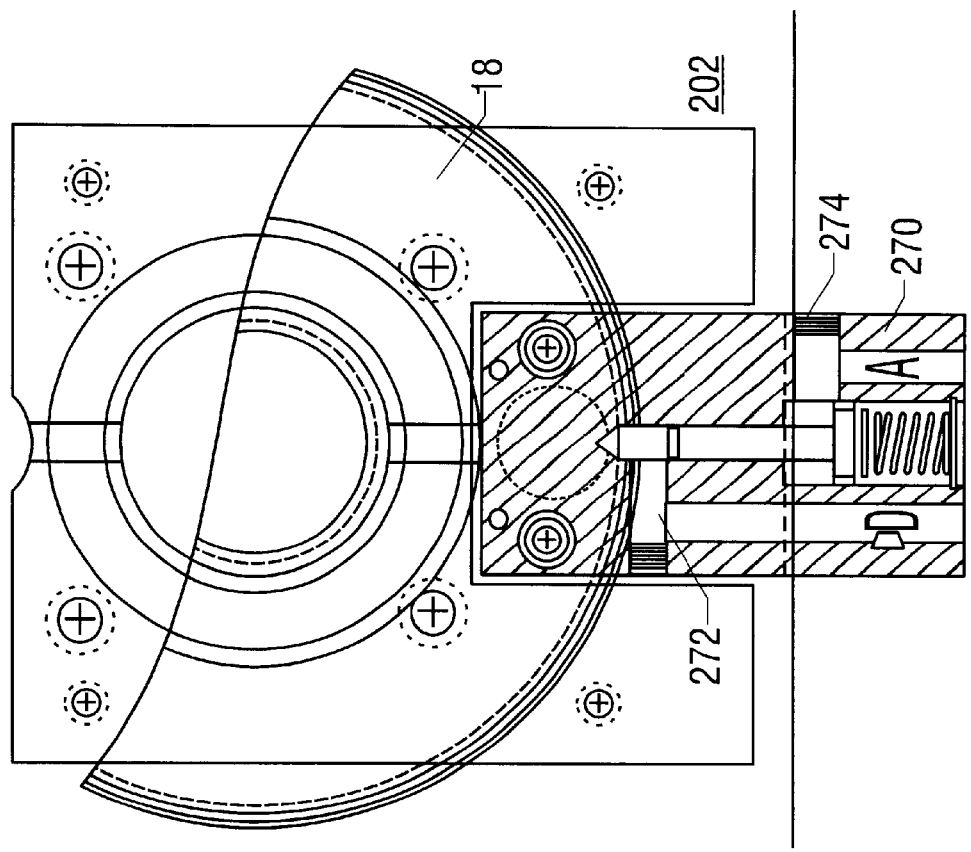
FIGS. 9A and 9B are side and front views illustrating a drain block for a freezing chamber in accordance with the present invention.
Figure 9A:
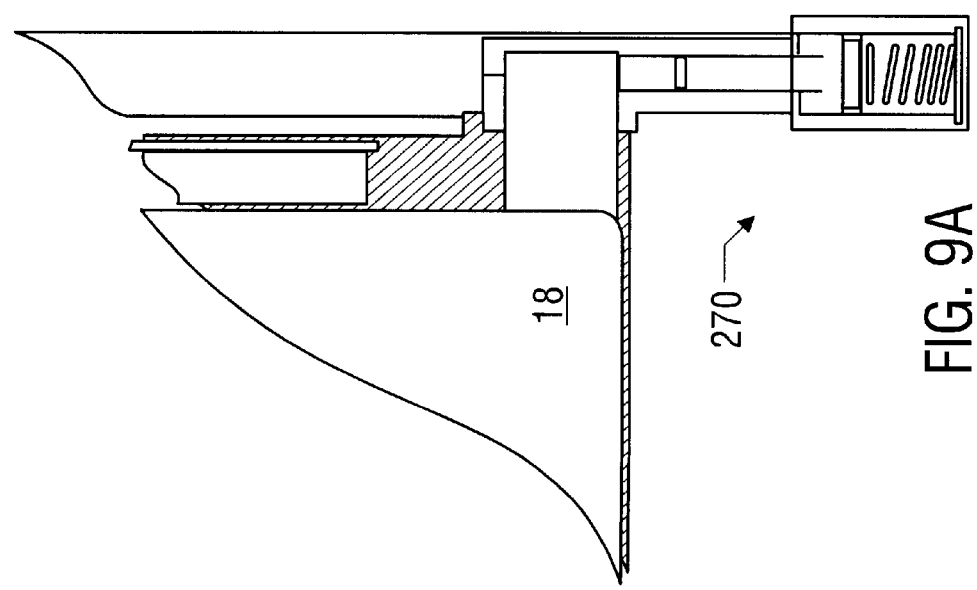

Each of the freezing chambers 18 has a respective drain valve assembly 270 attached thereto for draining the contents of the freezing chambers 18. The drain valve 270 is illustrated in additional detail in FIGS. 9A and 9B. The drain valve 270 is bolted to the freezing chamber 18, though any suitable connection may be used, such as welding the drain 270 to the chamber 18. The drain valve 270 includes a drain outlet 272 that is connected to a drain connection 275 of the machine 200. The drain connection 275 may be connected to the sewer or to a disposal tank, for example. The drain block 270 further includes an activate inlet 274 that receives pilot air from a three-way air-operated solenoid valve 276 on the header block 210. The three-way valve 276, which receives air from the regulator 204, has an outlet 278 connected to the activate inlet 274 of the drain block 270. In other embodiments, the drain valve 270 is operated via means other than an air pilot valve, for example, a solenoid directly activating the valve.

Figure 10:
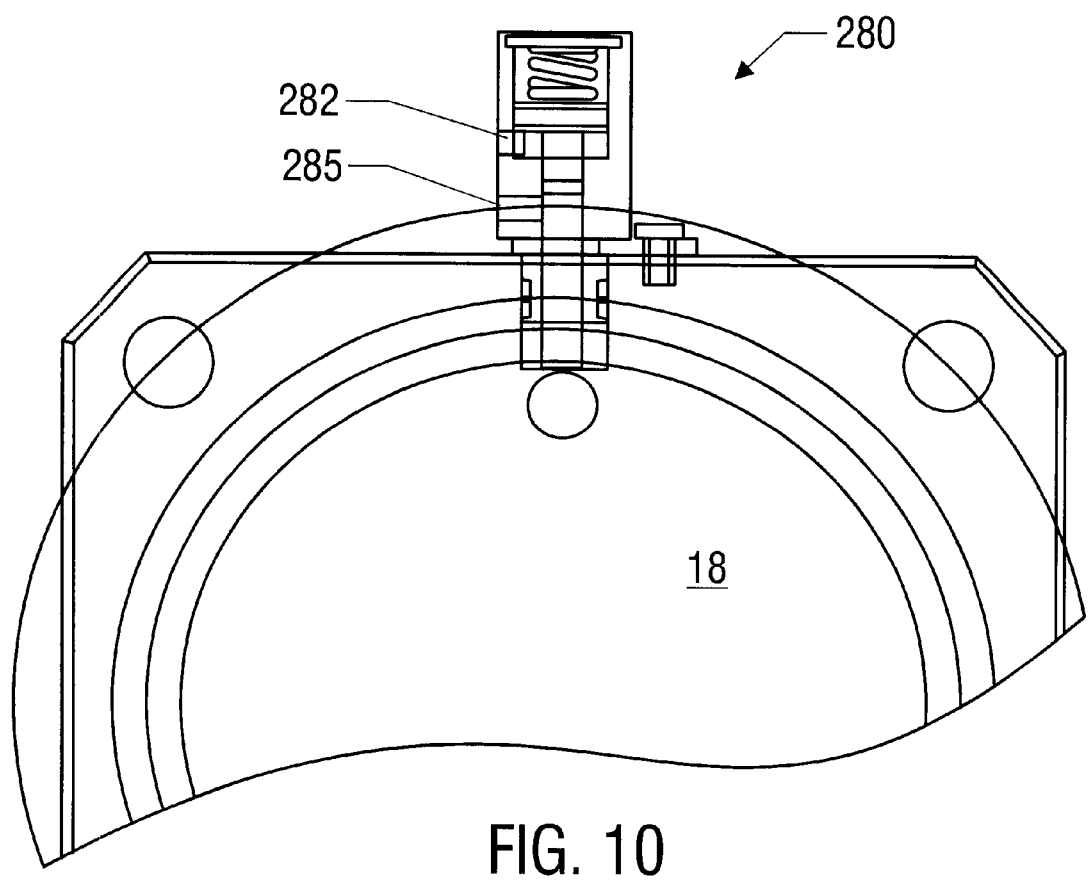
FIG. 10 is a schematic view of a vent system for a freezing chamber optionally provided in some embodiments of the present invention.

In certain embodiments, a vent valve assembly 280 may be provided for venting the freezing chambers 18, for example, when draining the contents contained therein. A suitable vent assembly 280 is shown in FIG. 10, and includes an air-operated vent valve connected to the top of the freezing chamber 18. Other mounting positions may be used; for example, the vent assembly could be mounted to the face plate of the freezing chamber 18. In machines including the vent assembly 280, an air pilot input 282 of the vent assembly is connected to the output of the regulator 204 via an appropriate valve, such as a three-way air-operated solenoid valve. The vent assembly further includes a vent outlet 285. Of course, the vent valve may be activated by means other than an air operated valve. For example, the vent valve may be directly activated by a solenoid.

A water pump 290 is connected to the water supply 21 via a water regulator 292. Water is supplied to the appropriate check valve 52 and input 51 of the mixing block 30, is controlled by the water module of the flow control device 205. A pressure transducer 54 is coupled between the flow control device 205 and the check valve 52. A carbon dioxide source 25 may also be provided if carbonated water is required. The syrup supply 22 is connected to the syrup module of the flow control device 205 via a pump 296 with a pressure transducer 54 at the outlet of the flow control device 205. The syrup supply 22 may comprise a "bag-in-a-box" container as is often used with beverage machines.

The bag and connections are sanitized and the contents are treated to remove contaminates so that refrigeration of the concentrated syrup solution is not necessary. Alternatively, a refrigerated compartment may be provided to eliminate the need for specially treated beverage ingredients. The refrigerated compartment may be incorporated into the beverage machine structure, allowing use of the refrigeration system 20 for cooling the syrup, in addition to refrigerating the freezing chambers 18. In other arrangements, a refrigerator separate from the beverage machine is used to preserve the syrup supply.

As noted herein, aspects of the present invention function to reduce contamination within the frozen beverage machine. The syrup is a concentrated solution with very little water content, it is less susceptible to the growth of contaminants. When water is added to the syrup it is "activated" and allows a much more rapid rate of bacteria growth. It is therefore critical at this point that the mixture be chilled. This is the function of the mixing block 30 as described above.

In order to eliminate any potential areas where the syrup mixture can accumulate in the delivery path without the ability to flow, elements in the frozen beverage machine that can trap liquids were eliminated. This required the elimination of the expansion tank, which is typically present in prior art systems, from the product delivery path. The expansion tank is designed to absorb the increase in pressure that is created by the growth of larger volume ice crystals and the gas that is released when the liquid is frozen.

Since there is no expansion tank to absorb the increase in pressure, the continuous thaw-freeze cycles could increase the pressure to unacceptable levels. In order to prevent this pressure rise and to maintain optimum product quality, a software routine executed by the controller 16 controls product consistency and limits pressure rise. In a typical prior art frozen beverage machine, product consistency is controlled by measuring the torque on a mixing device that is rotated to mix the beverage mixture within the freezing chamber. The torque required to turn the mixing device increases or decreases as the mixture approaches a more frozen or thawed state, respectively. The refrigeration is accordingly turned on or off to control the frozen state.

In addition to, or in place of, controlling refrigeration as a function of mixing torque, the pressure within the mixing chamber is monitored via a pressure transducer. As the pressure rise increases to a predetermined maximum pressure level, the refrigeration cycle is turned off and it is not allowed to start again until the pressure is reduced to a predetermined minimum pressure. In this manner, the ice melts to an acceptable level to maintain product quality and prevent the freezing chamber from over pressure conditions. In addition, this method wherein the refrigeration system is prevented from starting until the pressure is reduced may also be controlled also by opening the drain valve 270 that couples the freezing chamber 18 to the sewer, and/or opening the vent assembly 280, thus releasing the pressure as it accumulates.

Figure 11:
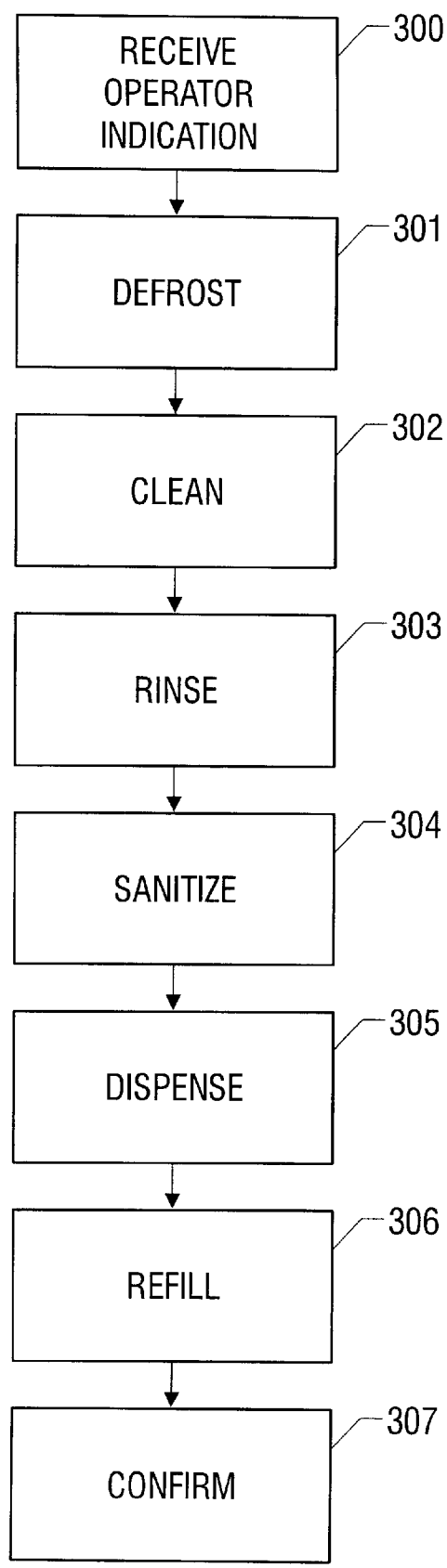
FIG. 11 is a process flow chart illustrating a sanitation process in accordance with the present invention.

FIG. 11 illustrates an automated cleaning and sanitation process in accordance with aspects of the present invention. The automated cleaning process is sometimes referred to herein as "clean in place," or "CIP." The CIP process controlled by the onboard controller 16 via software code that implements the various processes described herein Alternatively, the CIP process could be controlled by a processor located remotely from the machine. The CIP process is initiated by an operator pushing a button on the control panel of the beverage machine. Alternatively, the CIP process could be started in response to a predetermined event, such as the passage of a desired time interval since the previous cleaning, the passage of a desired time interval since a freeze cycle has occurred, a loss of power, etc. In some embodiments of the machine 200, an integrated status panel provides indications for an operator to initiate the CIP process. For example, after the passage of a predetermined time period since the last sanitation, a "start sanitize" button may be illuminated.

Upon the controller's receiving an indication that a user has activated the appropriate button to initiate the CIP process in block 300, the machine is defrosted in block 301. The defrost process includes draining the contents of the freezing chamber 18 that is being cleaned. After the freezing chamber 18 is defrosted, an automatic clean cycle begins in block 302. The clean cycle includes dispensing cleaning solution, such as detergent or a bleach solution, from the cleaner supply 250 along with water into the freezing chamber 18. In exemplary embodiments, a concentrated sanitizing solution is used; hence, the controller 16 is programmed to automatically mix the concentrated cleaning solution with water and then use the resulting solution to sanitize the machine.

The beater motor is operated to agitate the cleaning solution within the freezing chamber 18, then the solution is drained from the freezing chamber 18. In block 303, an automatic rinse cycle is performed, wherein water is dispensed into the freezing chamber 18 and agitated therein by operating the beater motor. The water is then drained. Depending on the type of cleaner, the concentration thereof, etc., the rinse cycle may or may not be required. Following the rinse cycle, a sanitation cycle is performed in block 304. A sanitizing solution, such as a bleach solution, is dispensed into the freezing chamber 18. Again, depending on the situation, multiple cleaning cycles may or may not be required. To accomplish separate cleaning and sanitation cycles, both a cleaning solution such as detergent and a sanitizing agent such as bleach may provided. Alternatively, the clean cycle 302 can essentially be repeated in block 304. In block 305, after the sanitizing solution is dispensed into the freezing chamber 18 and agitated, the controller pauses the process and waits for the operator to press a "continue" button.

The process is paused to allow an operator to manually draw sanitizing solution from the freezing chamber 18 through the dispensing valve 18 to insure the valve 18 is also sanitized. After drawing the solution, the operator activates the continue button to confirm that the valve sanitation has occurred. In other embodiments using an automated dispensing valve 18, sanitation of the valve may be performed in an automated fashion. Upon receiving the continue indication via the push-button, the sanitizing solution is drained from the freezing chamber 18.

In block 306, the beverage mixture is dispensed into the freezing chamber 18 and agitated, then frozen. Finally, in block 307, the operator taste tests the product and activates the appropriate control panel button to confirm the completion of the sanitation process. Further, in addition to the automated cleaning procedure described herein, sanitizing can occur by essentially the same method that frozen carbonated beverages are produced. A bag or container of sanitizing solution is attached to the machine in the same way the syrup mixture is attached and the sanitizing solution is pumped throughout the delivery and freezing areas. This is typically done periodically to sanitize the syrup flow path prior to the mixing block, in addition to the other components of the machine.

Figure 12A:
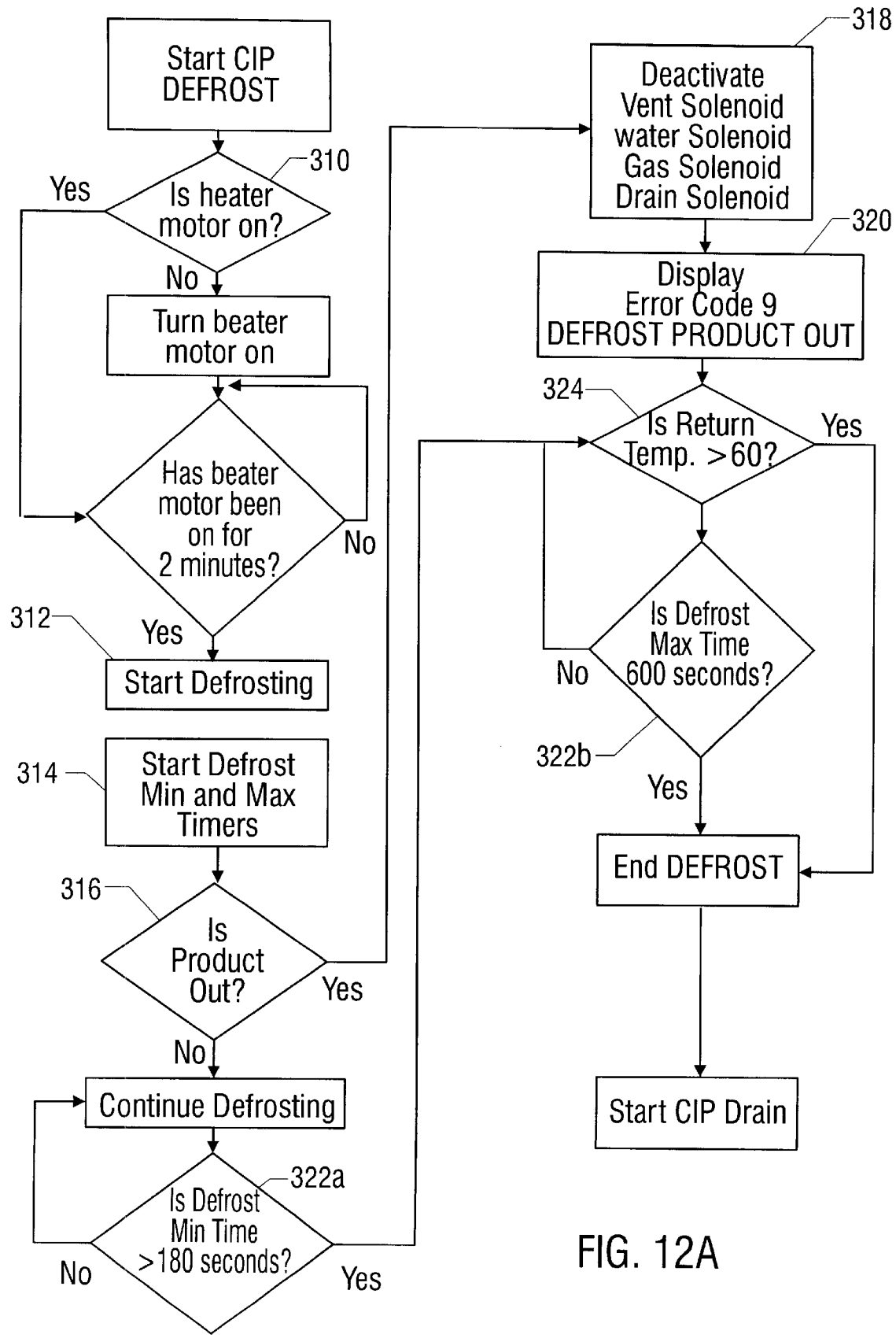
FIGS. 12A–12L are flow charts illustrating the process of FIG. 11 in further detail.

FIGS. 12A–12L illustrate the various CIP processes in detail in accordance with a specific embodiment of the invention. After receiving the indication to begin the CIP process in block 300 of FIG. 11, the CIP defrost as illustrated in FIG. 12A is started. The controller first determines whether the beater motor 220 is on in block 310, and if necessary, turns on the beater motor 220. The motor is operated for a predetermined time (two minutes in the illustrated process), then a defrost cycle begins in block 312. Defrost timers are started in block 314, and the defrost cycle continues for a predetermined time period (blocks 322a,b) or until the temperature reaches a desired level (block 324).

Figures 1, 12B:
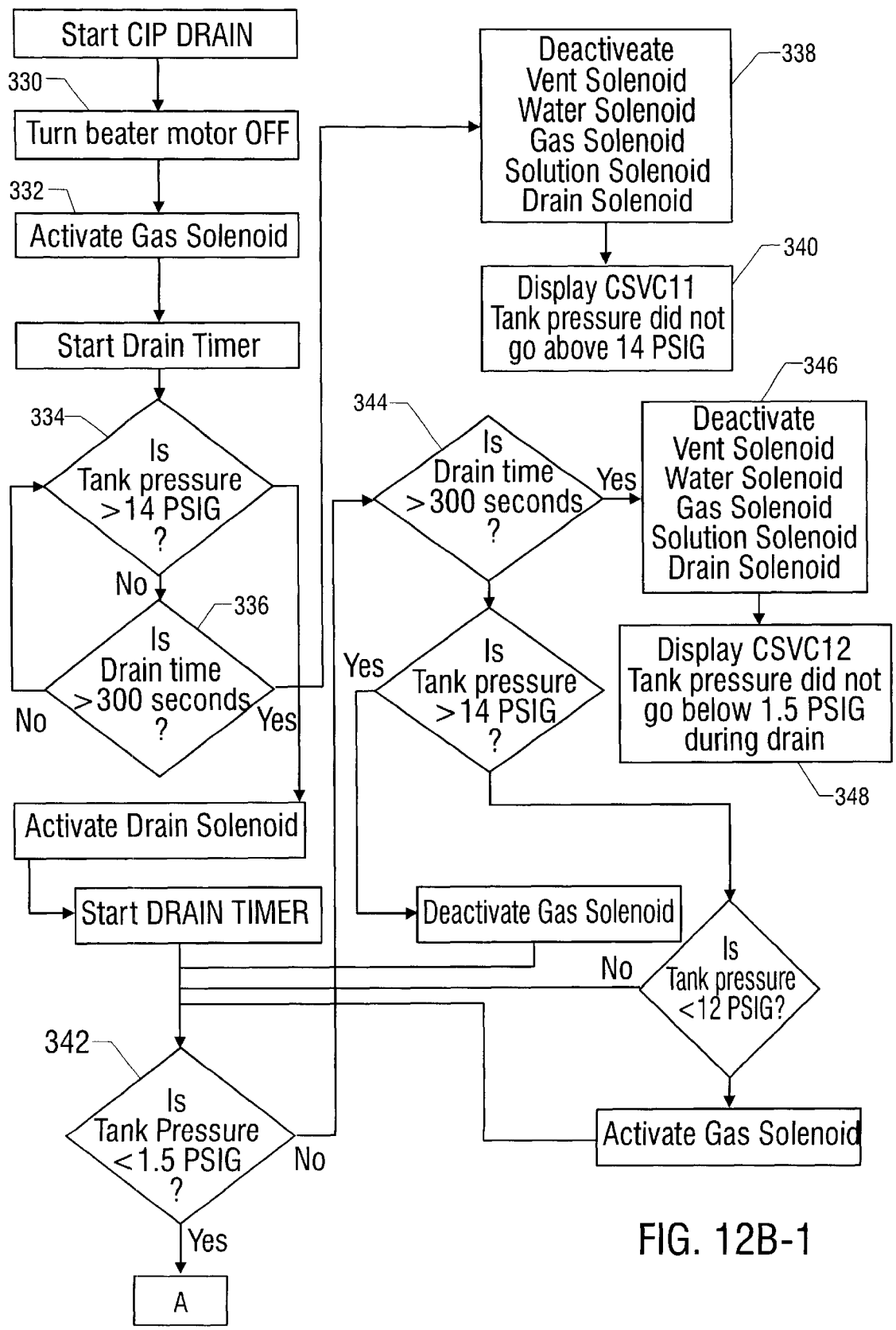
Figures 2, 12B:
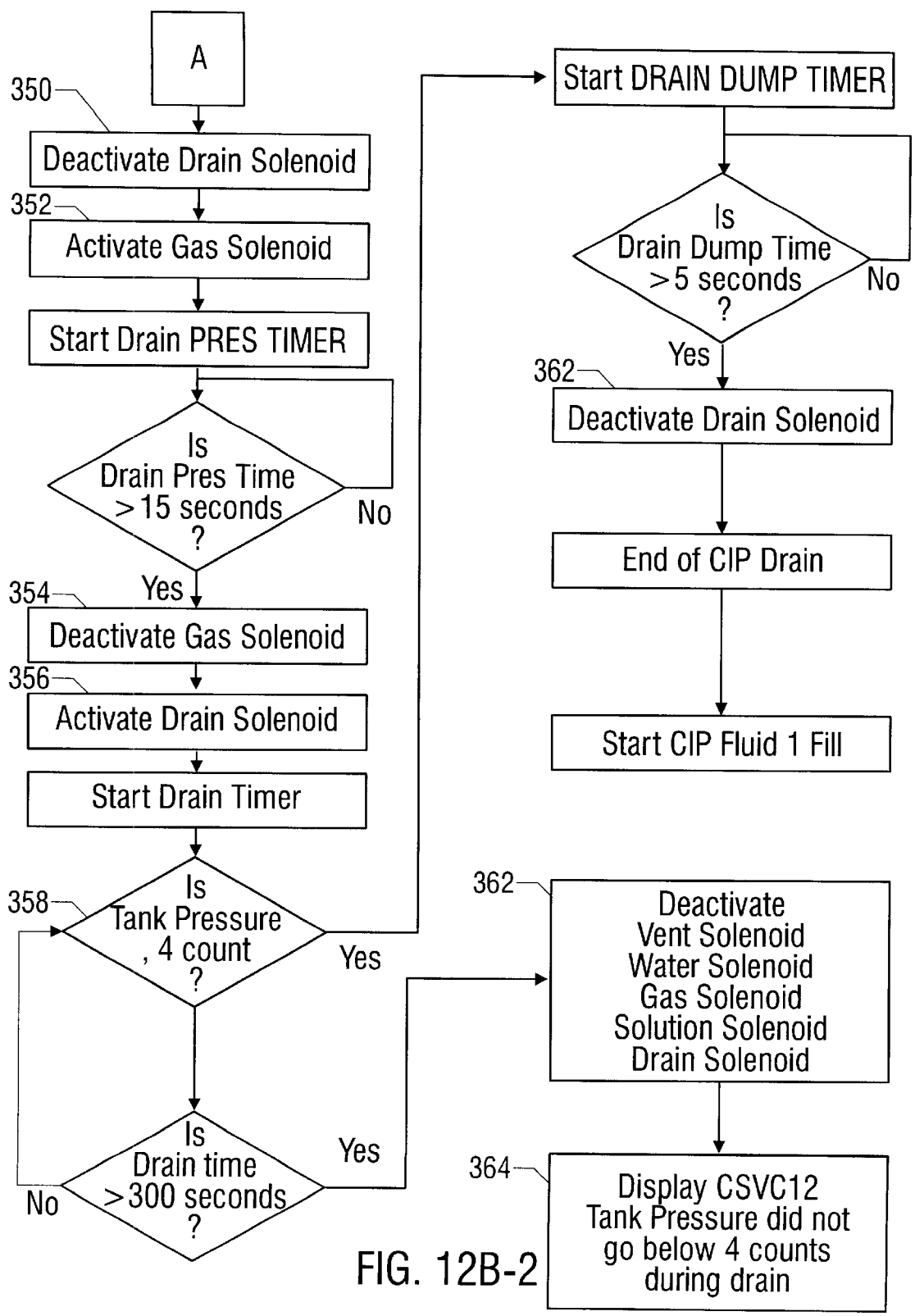

When the CIP defrost is complete, the CIP drain begins as illustrated in FIG. 12B. The beater motor 220 is turned off in block 330 and the gas (air in the illustrated embodiment) valve 242 is activated in block 332 to pressurize the freezing chamber. The freezing chamber pressure is monitored via the appropriate pressure transducer 54, and when it reaches a predetermined pressure (14 PSIG in the illustrated embodiment, block 334) the drain solenoid 276 is activated to open the drain valve 270.

When the pressure in the freezing chamber 18 falls below a predetermined level (about 1.5 PSIG in the illustrated embodiment, block 342), the freezing chamber is re-pressurized. In block 350 the drain 270 is closed and the gas valve 242 is opened in block 352. After a predetermined time period has elapsed, the gas valve 242 is closed and the drain 270 is opened (blocks 354, 356) until the pressure in the freezing chamber 18 again falls to a predetermined level as determined in block 358. Once the pressure has fallen below a predetermined level, the drain 270 remains open for an additional time period and is then closed in block 362.

Figure 12C:
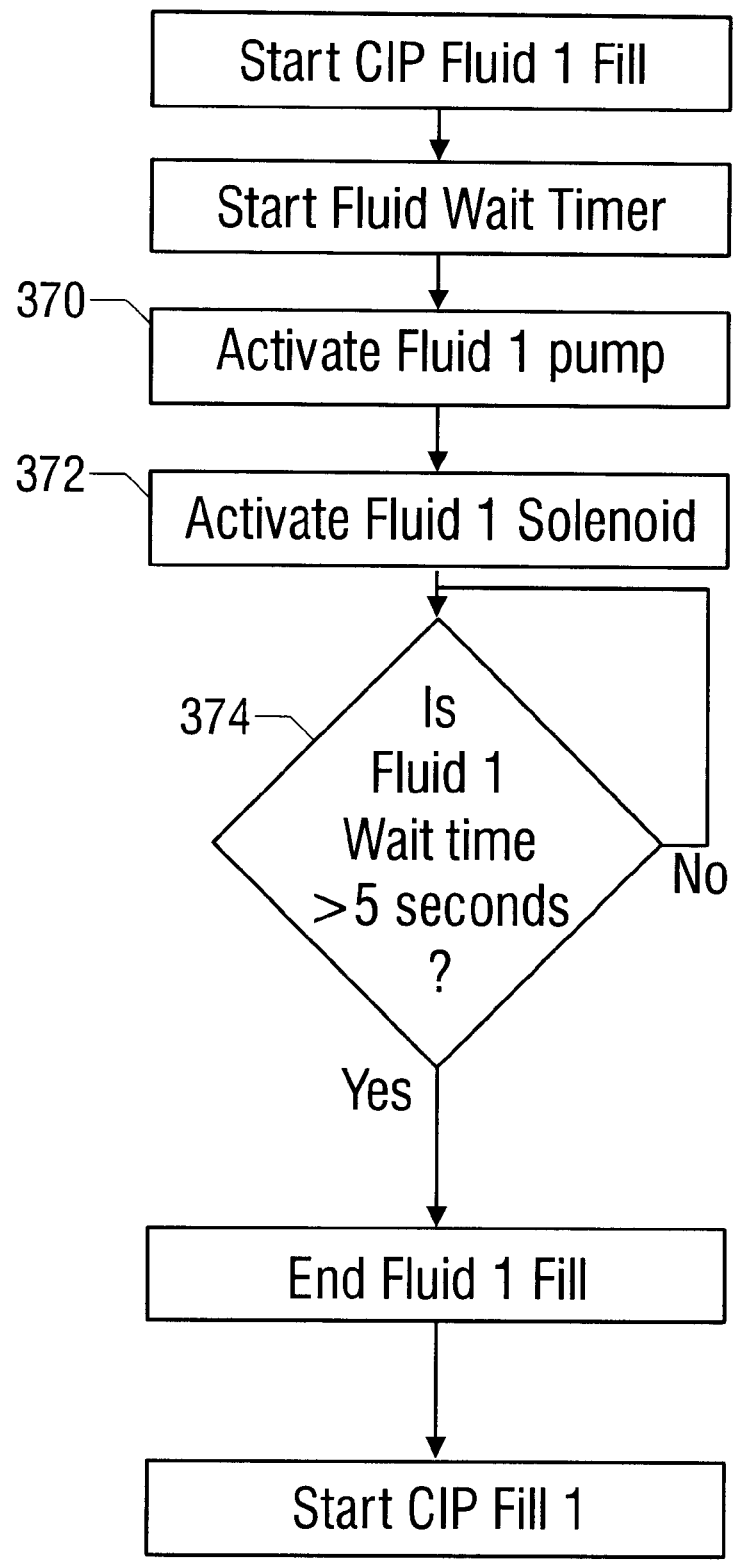
Figure 12D:
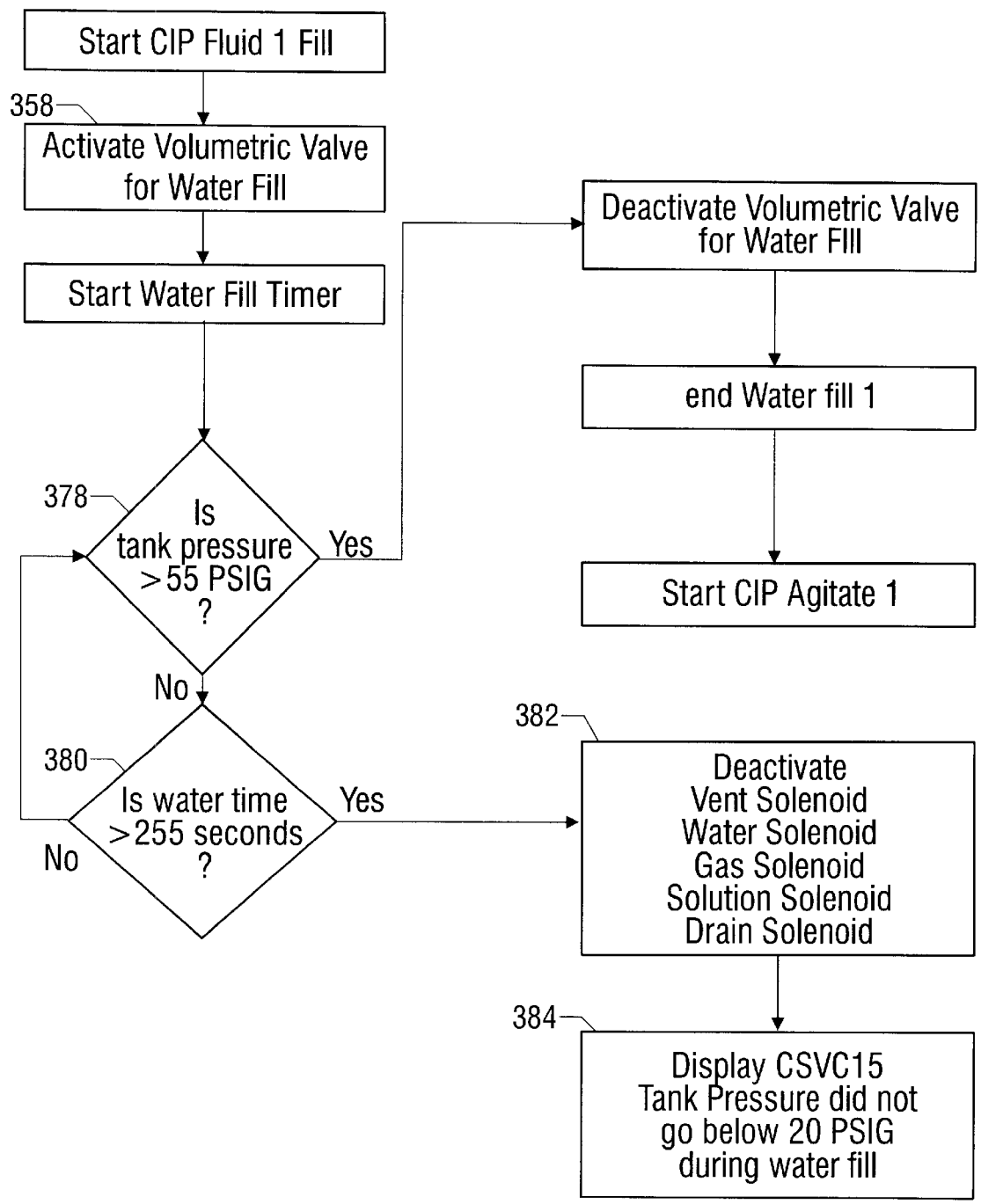

Following the defrost cycle, the automatic clean cycle is performed. A cleaning solution is dispensed into the freezing chamber 18 as illustrated in FIGS. 12C and 12D. Referring first to FIG. 12C, the sanitation pump 253 is activated in block 370 and the sanitation valve 262 is opened in block 372. The cleaning solution flows from the supply 250 for a predetermined time period as monitored in block 374, then the sanitation pump 253 is deactivated and the sanitation valve 262 is closed in block 375. In the illustrated embodiment, a concentrated cleaning solution is used. Thus, it diluted with water. In other embodiments, this dilution may not be required.

Referring now to FIG. 12D, after the time period has passed, the flow control device 205 is activated in block 346 to allow water to flow into the freezing chamber 18 until it reaches a predetermined pressure (55 PSIG in the illustrated embodiment, block 378) to dilute the concentrated cleaning solution. When the desired pressure is reached, the control device 205 is deactivated in block 386.

Figure 12E:
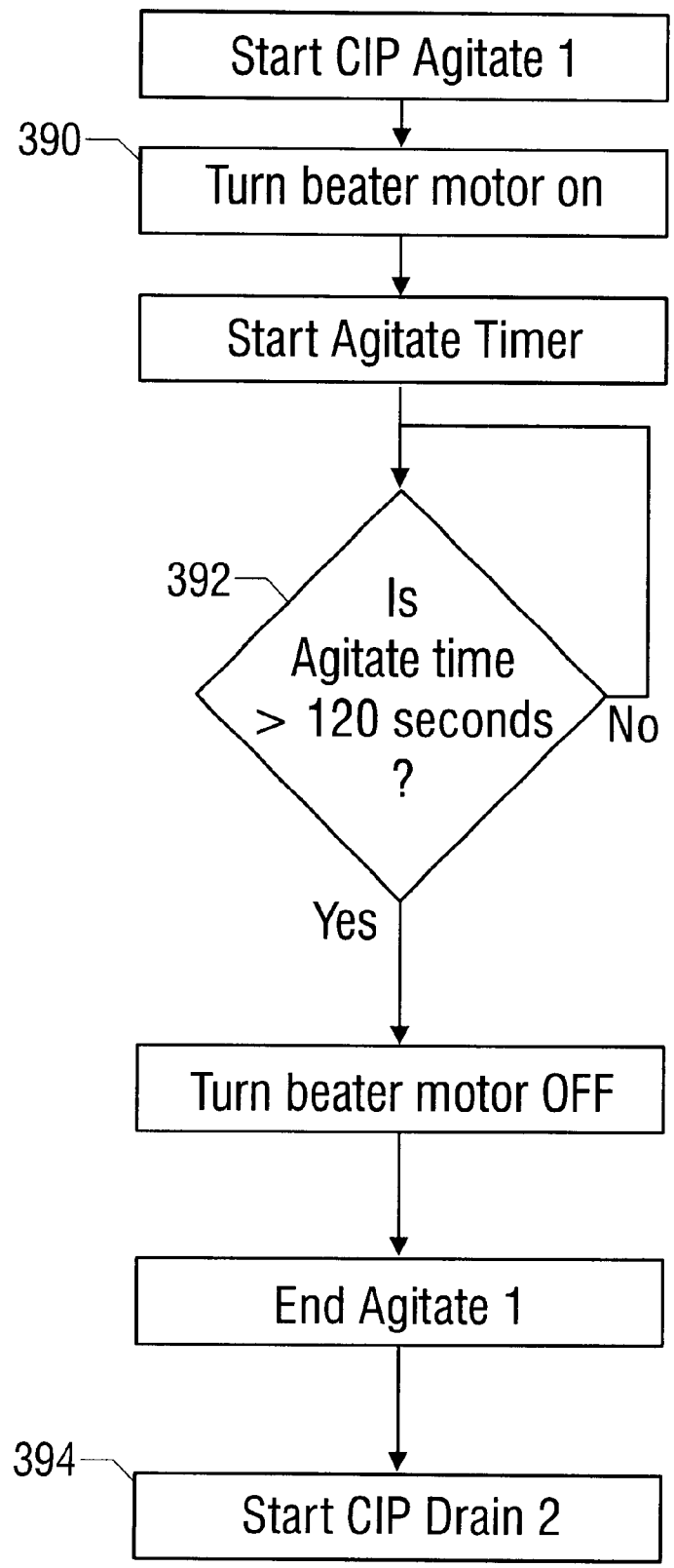
Figures 1, 12F:
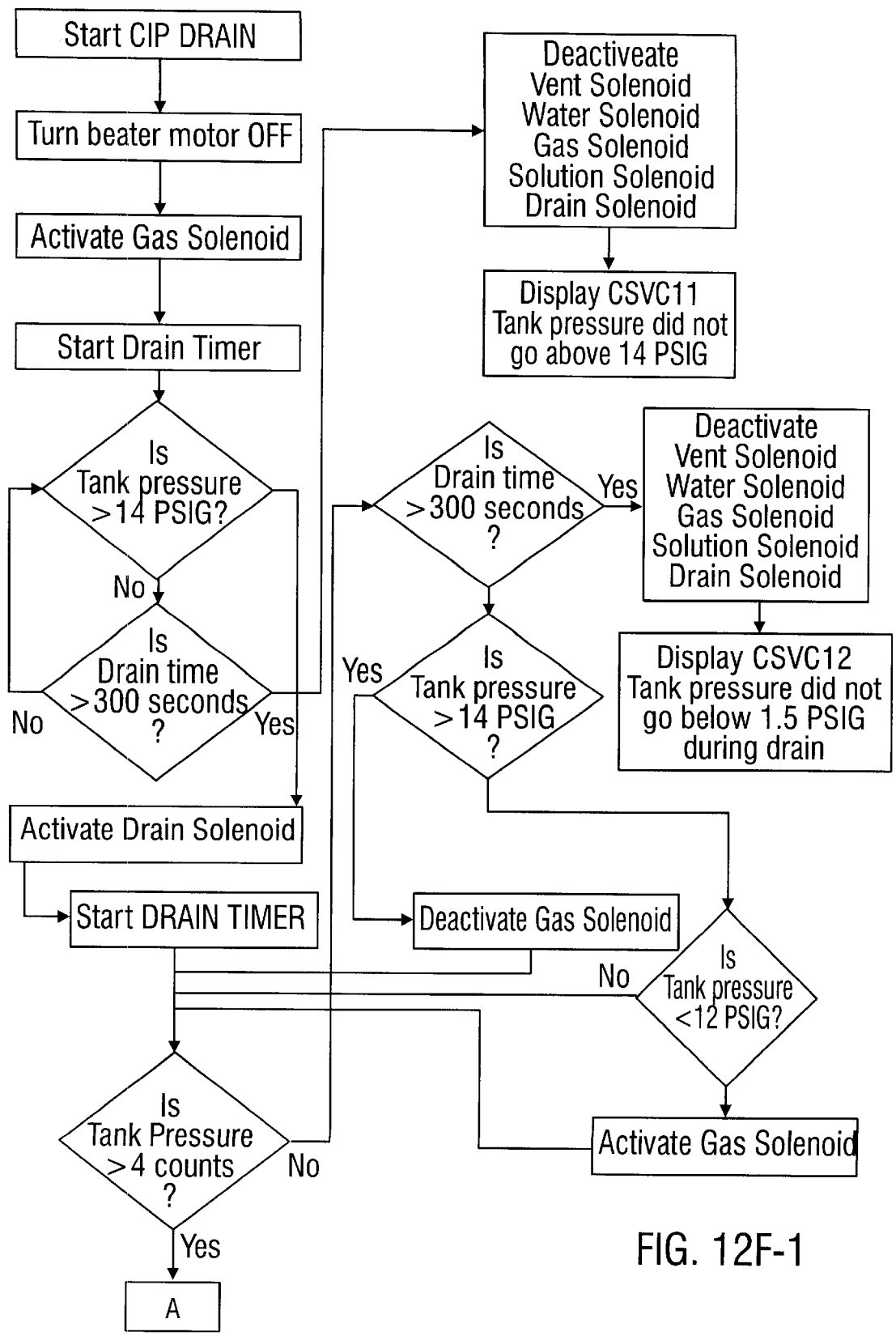
Figures 2, 12F:
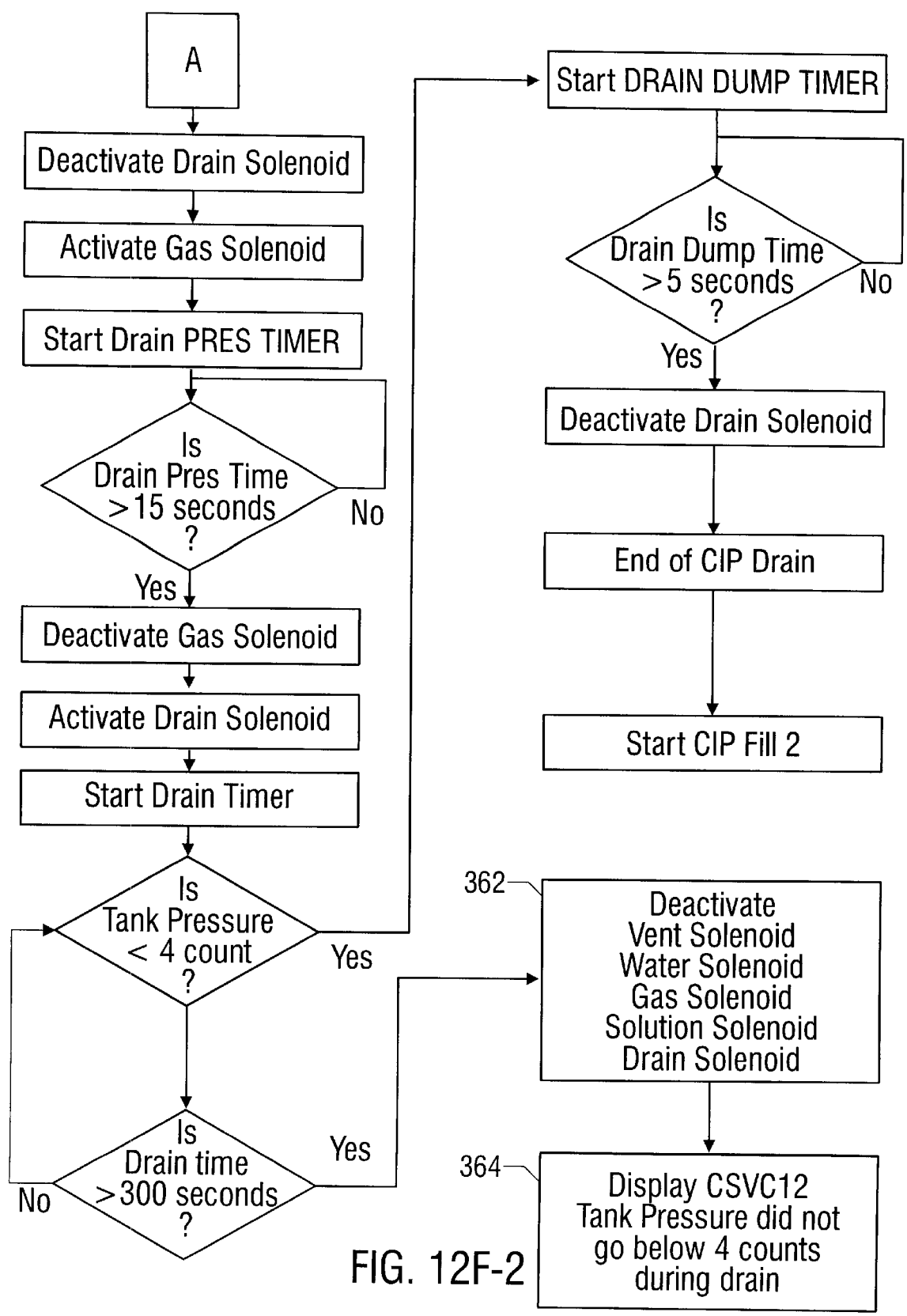

The cleaning solution and water mixture is then agitated in the freezing chamber 18. FIG. 12E illustrates the CIP agitate process. In block 390, the beater motor 220 is turned on and operated for a predetermined time period as ascertained in block 392. Following the predetermined time period (120 seconds in this embodiment), the beater motor 220 is turned off and the CIP drain 2 is initiated in block 394 to drain the cleaning solution from the freezing chamber 18. The CIP drain 2 process, illustrated in FIG. 12F, is essentially a repeat of the CIP drain process illustrated in FIG. 12B.

Figure 12G:
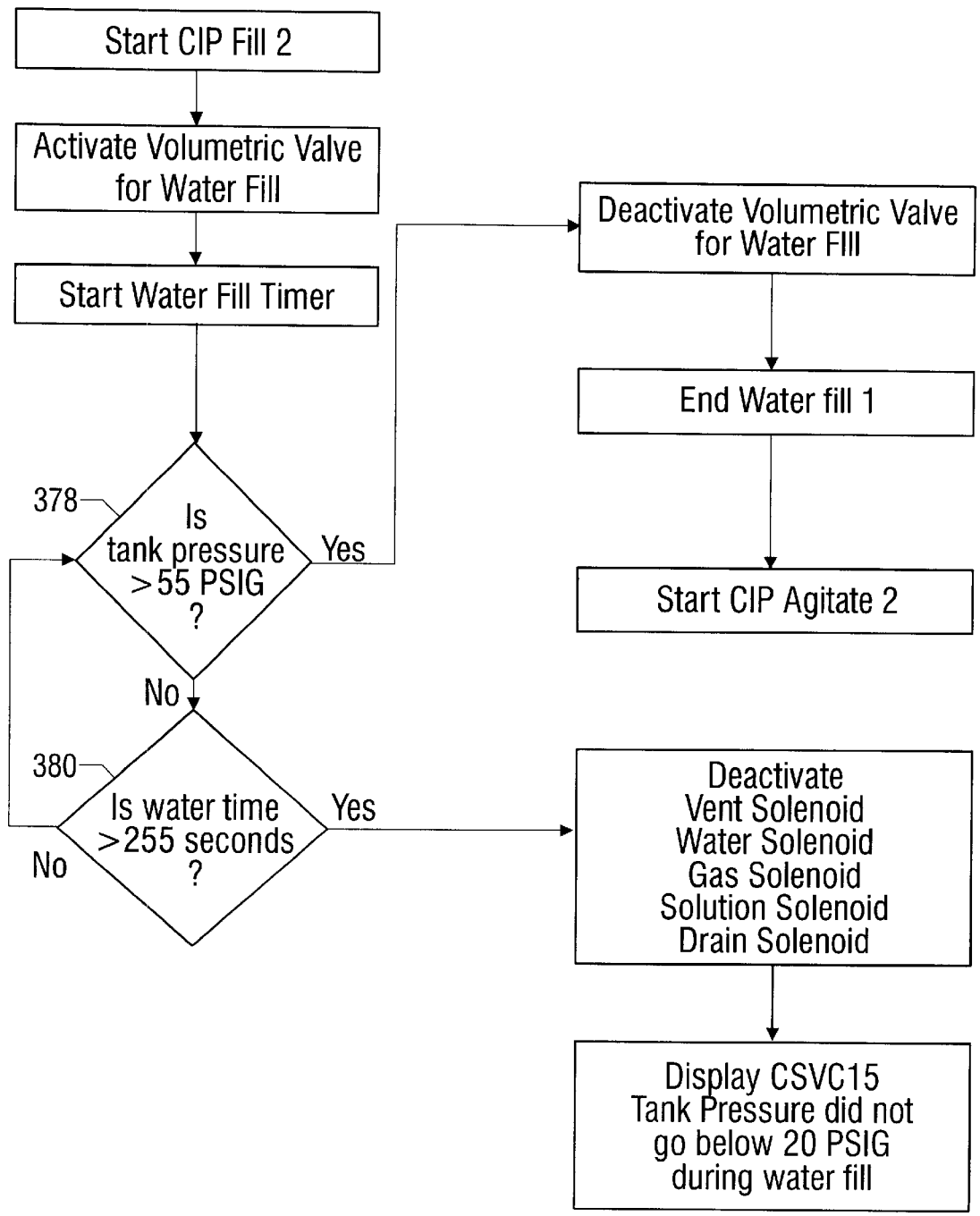
Figure 12H:
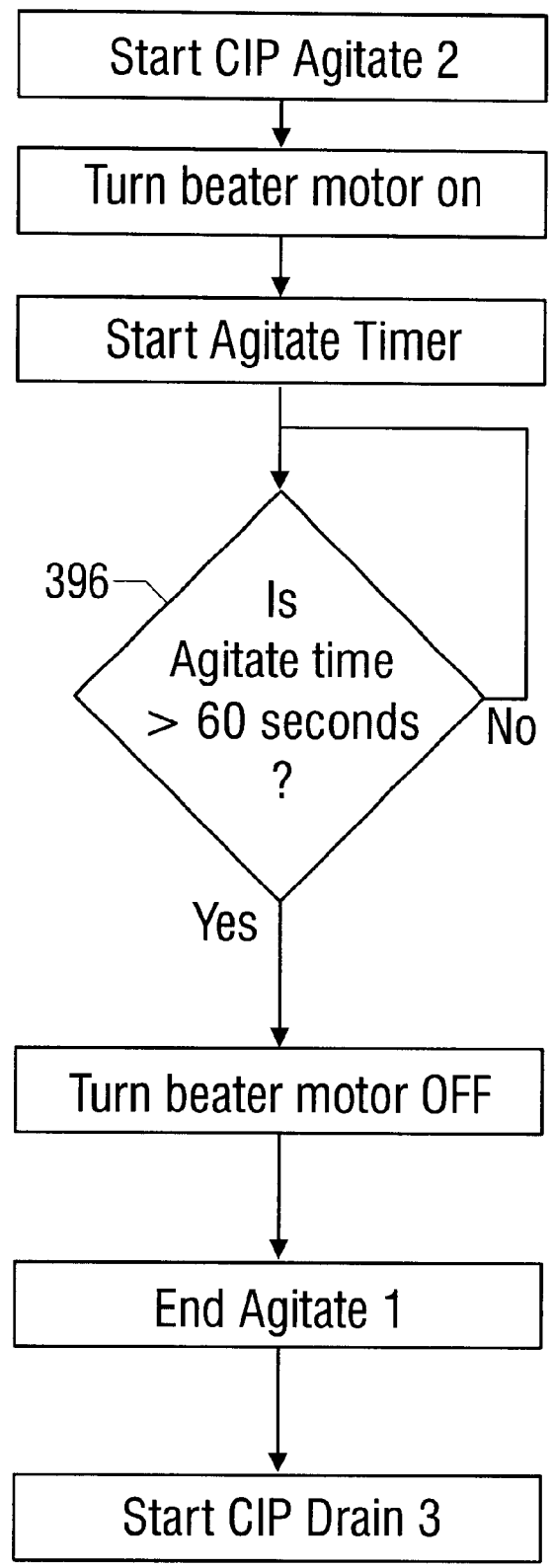

After draining the cleaning solution, the freezing chamber is rinsed. Depending on the type of cleaning solution used, the rinse cycle may or may not be necessary. The CIP Fill 2 process is executed as illustrated in FIG. 12G. The process shown in FIG. 12G is essentially a repeat of the water fill process illustrated in FIG. 12D, and functions to rinse the freezing chamber 18. After the water is dispensed into the freezing chamber according to the CIP Fill 2 process shown in FIG. 12G, the CIP Agitate 2 process is initiated as shown in FIG. 12H. The Agitate process shown in FIG. 12H is the same as that shown in FIG. 12E, except the beater motor 220 is operated for a shorter time period, 60 seconds as shown in block 396. The rinse cycle is then completed by draining the water from the freezing chamber 18. This drain process is the same as that illustrated in FIG. 12F.

Figure 12I:
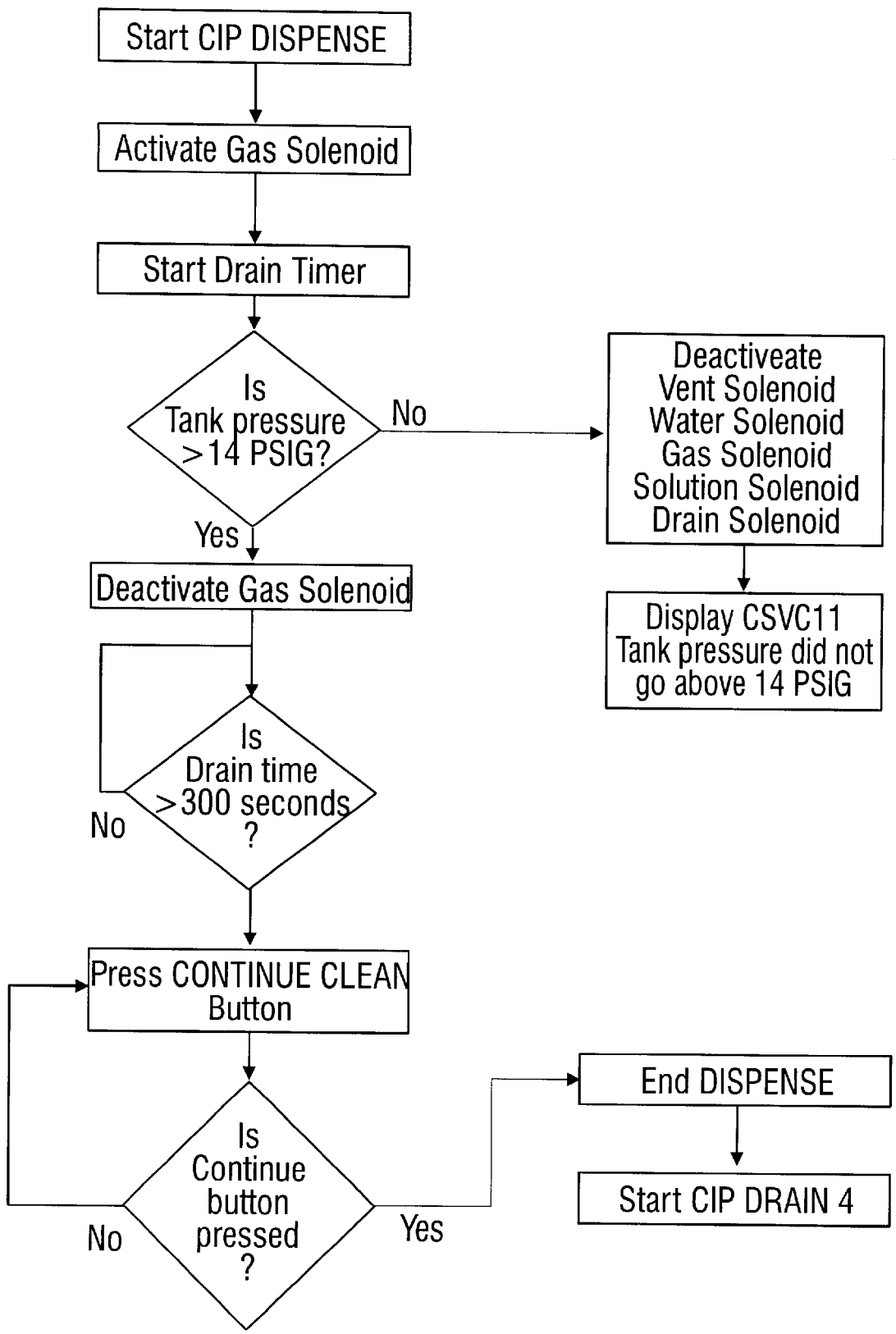
Figure 12J:
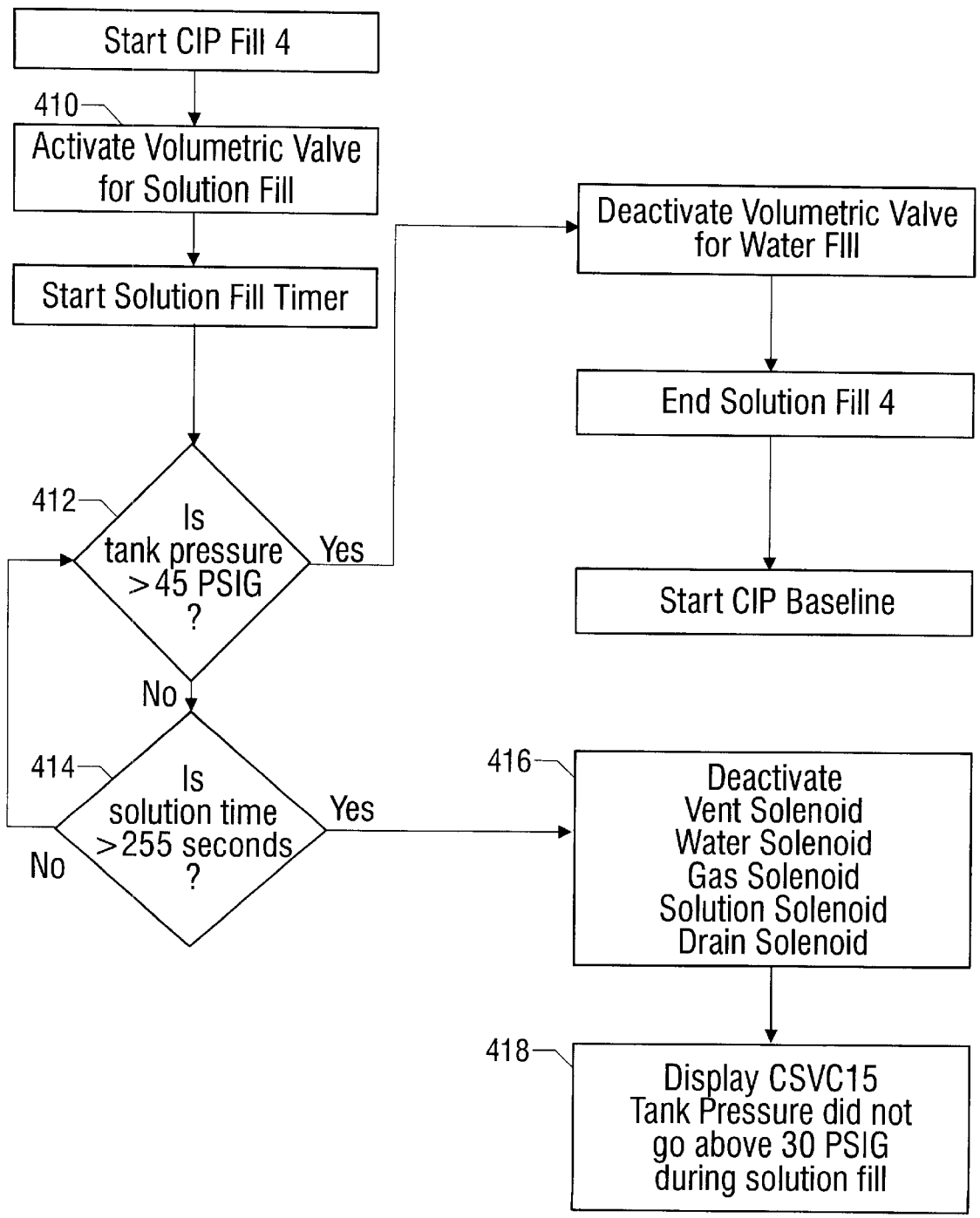
Figure 12K:
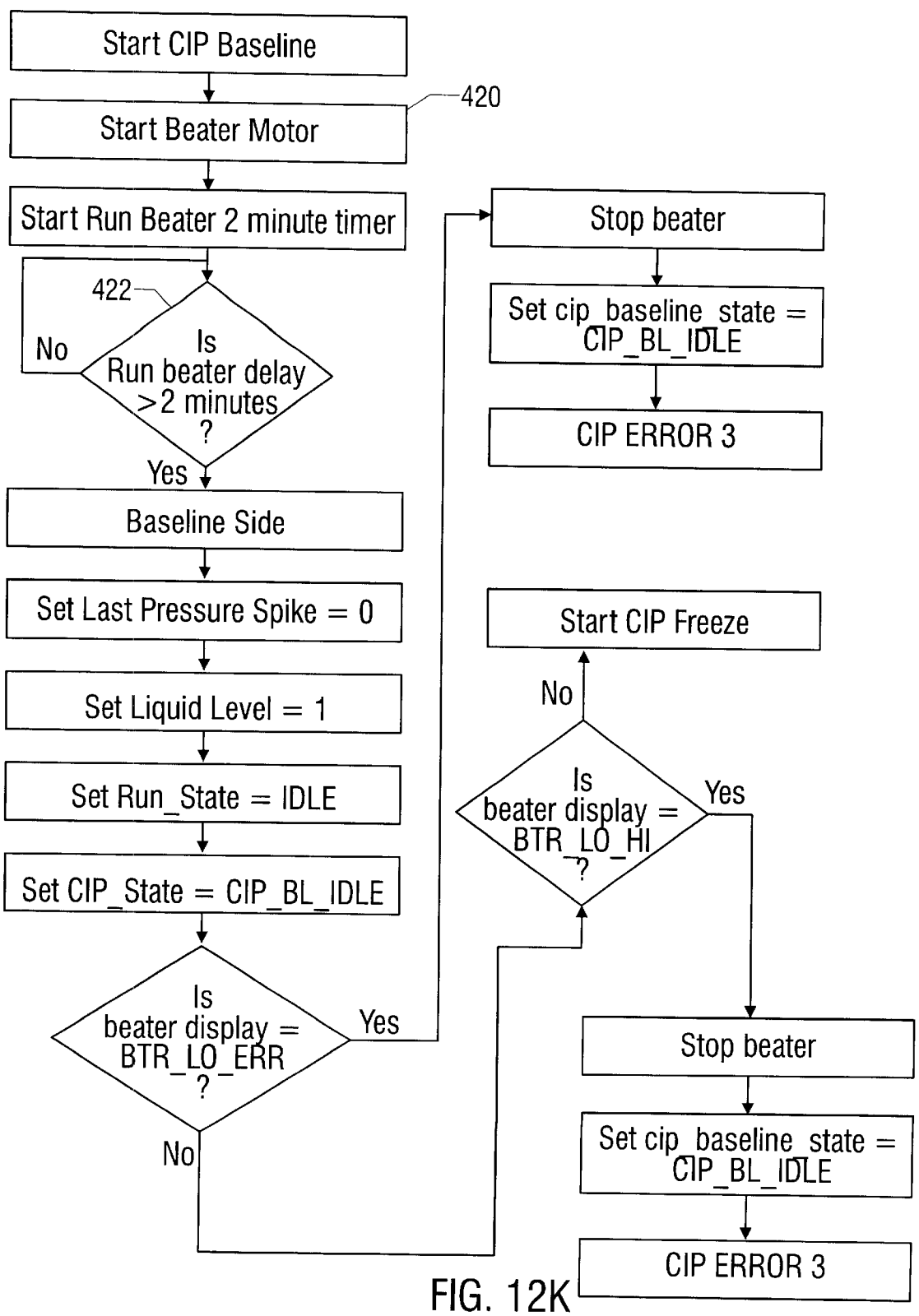
Figure 12L:
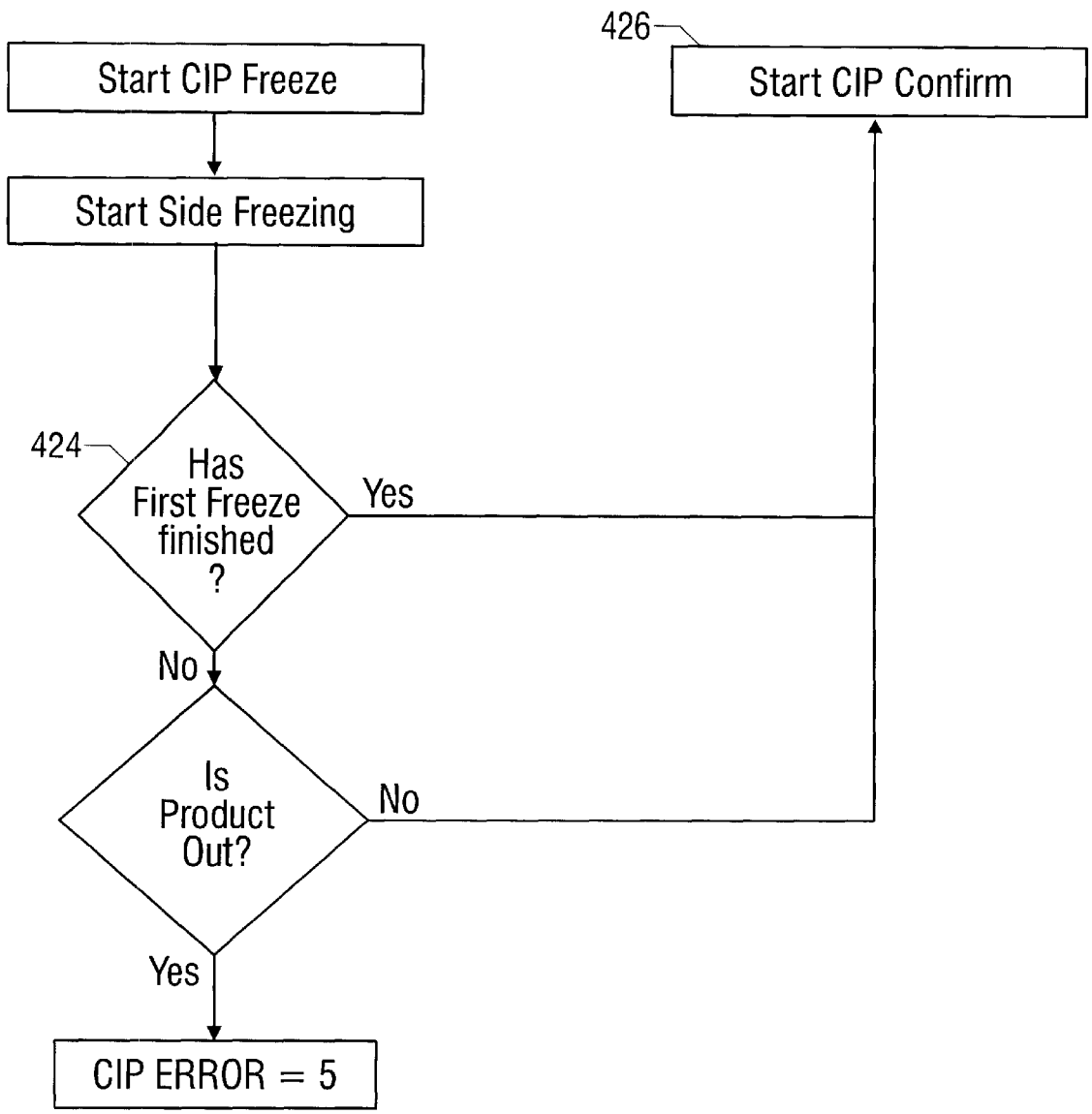

Next, a sanitation cycle is performed. Dispensing the sanitizing solution and water into the freezing chamber 18 is essentially a repeat of the Fill and Agitate processes illustrated in FIGS. 12C–12E, though a sanitizing solution such as bleach may be used, where a detergent is typically used in the clean cycle. Additional clean/sanitize cycles may be performed, if desired. After the sanitizing solution is agitated, a CIP dispense process is initiated as illustrated in FIG. 12I. In block 400, a "continue clean" button is illuminated, and the controller pauses the process until receiving an indication that the continue button has been activated (block 402). As noted herein above, at this point in the process a volume of cleaning solution is dispensed through the dispensing valve 80 to sanitize the valve. Once the continue button has been activated, the sanitizing solution is drained from the freezing chamber as illustrated in FIG. 12B and 12F. After the cleaning solution has been drained, the freezing chamber 18 is filled with beverage solution as shown in FIG. 12J. In block 410 the flow control device 205 is activated to begin flow of the beverage solution to the freezing chamber 18. The beverage solution is supplied to the freezing chamber 18 until it reaches a predetermined pressure (45 PSIG in the illustrated embodiment, block 412). If the predetermined pressure is not reached by a predetermined time after starting the fill process, the valves are closed and an error message is displayed (blocks 414, 416, 418). The CIP baseline process is shown in FIG. 12K, in which the beater motor is operated for a preset time (blocks 420, 422), then various control variables are set. The freezing chamber is then refrigerated to freeze the beverage mix, as illustrated in FIG. 12L. Once the beverage mix is frozen (block 424), a Confirm process may be initiated in block 426. The confirmation, for example, may require an operator to dispense some of the frozen beverage and taste-test it, followed by activating a button indicating that the cleaning process is complete. In some embodiments, the confirm process is not necessary.

Figure 13:
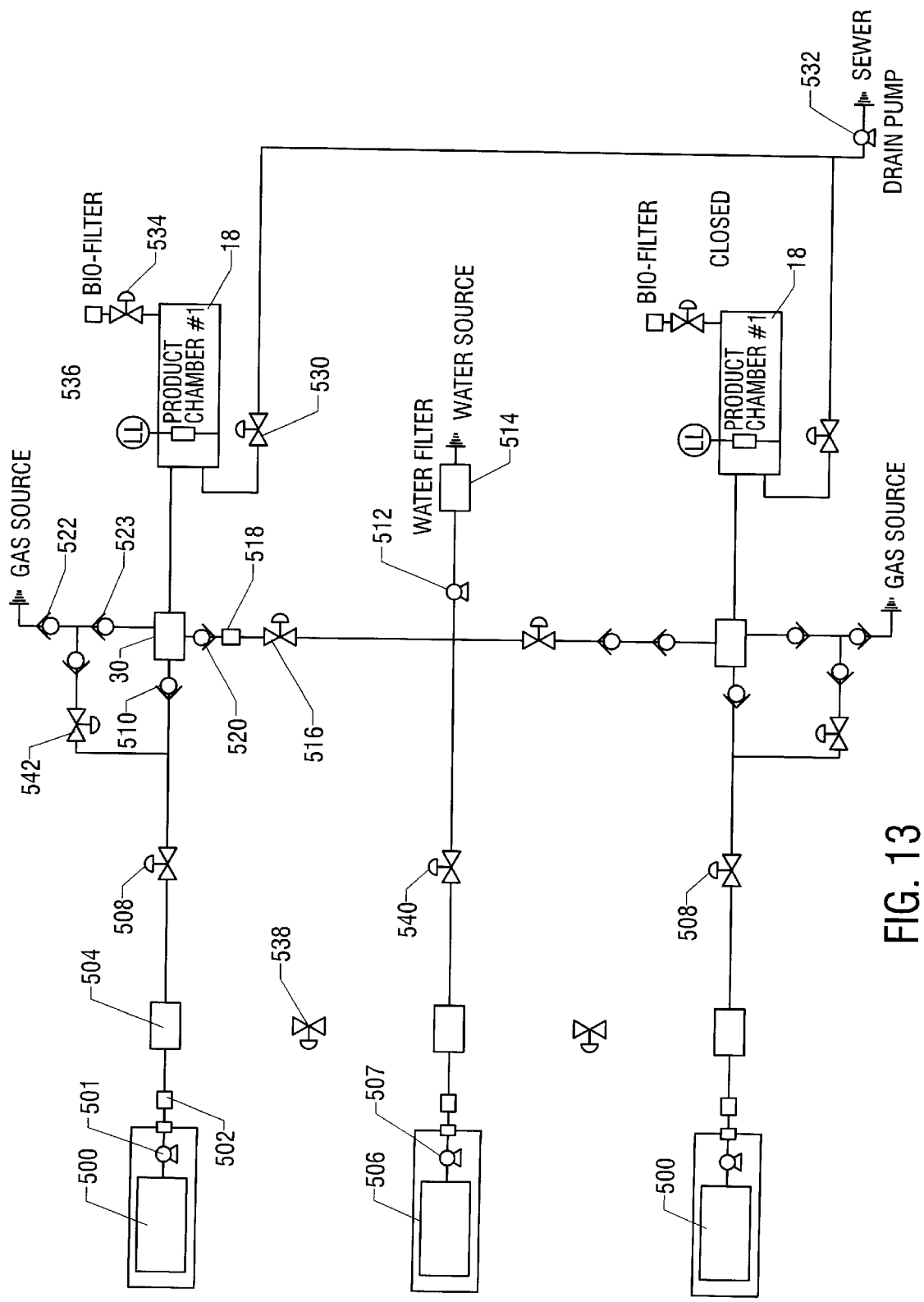
FIG. 13 is a schematic diagram illustrating a frozen beverage machine in accordance with another embodiment of the present invention.

FIGS. 13 illustrates an alternative embodiment of the frozen beverage system. As in the embodiment illustrated in FIGS. 6 and 7, the schematic diagram of FIG. 13 illustrates a system having two freezing chambers, each having a syrup source connected thereto via the mixing block. This allows dispensing two different beverages, or two flavors of a single beverage, from a single machine. The cleaning process disclosed, as well as other aspects of the invention, however, are applicable to machines having any number of freezing chambers. For sake of simplicity, the system operation is described in terms of one of the freezing chambers and its associated components illustrated in FIG. 13.

Referring to FIG. 13, a product pump 501 transfers the syrup from a syrup source 500 through a brix adjuster 502, and through a two-way solenoid 504 set to position 1, which connects the syrup source 500 to the system, and disconnects the cleaning fluid source 506. The syrup continues through an open shutoff solenoid 508, and a check valve 510 to a mixing block 30.

Simultaneously, a water pump 512 transfers water from a water source through a water filter 514, an open shutoff solenoid 516, a brix adjuster 518, and a check valve 520 to mixing block 30. Also simultaneously, gas (carbon dioxide in the exemplary system illustrated), is injected from a gas source through check valves 522,523 into mixing block 30. The syrup, water and gas begin mixing in the mixing block 30 to form a mixture. The mixture is delivered via an adapter to a freezing chamber 18. The mixing block 30 may include a static mixer (such as that shown in FIGS. 5A–5C) to facilitate the mixing of the ingredients to form a beverage mixture. The freezing chamber 18 freezes the mixture, and stores the frozen product until it is dispensed.

As with the embodiment described previously, the embodiment of the invention shown in FIG. 13 provides a completely automated process to automatically sanitize the product delivery system controlled by the on board microprocessor in the frozen beverage machine. The controller 16 is programmed to initiate the cleaning process upon activation of a button on a control panel of the frozen beverage machine. The controller 16 may also be programmed to initiate the cleaning process in response to other predetermined variables, for example, at preset time intervals. The cleaning process includes a drain cycle, a clean cycle, and a rinse cycle, which are described further in turn below. The clean cycle may include both cleaning and sanitation cycles.

The first step in the cleaning process is to drain the freezing chamber 30 of all frozen product mixture. Shutoff solenoid 530 opens to allow the frozen mixture to drain out of the bottom of the freezing chamber 18. A drain pump 532 pumps the mixture from the freezing chamber 18 to the sewer. Alternatively, pressurized gas may be introduced into the freezing chamber 18 to force the mixture out of the freezing chamber 18, eliminating the need for the drain pump 532 as in the process illustrated in FIGS. 11 and 12. If the pressure in the freezing chamber 18 falls below atmospheric pressure, solenoid 534 is opened to equalize the pressure. When a liquid level sensor 536 senses the freezing chamber 18 is empty, the drain pump 532 stops and all solenoids close.

The next step in the process is to fill the freezing chamber 18 with cleaning solution. A concentrated sanitizing solution may be used, wherein the controller 16 is programmed to automatically mix the concentrated cleaning solution with water and then use the resulting solution to sanitize the machine. The two-way solenoid 504 moves to position 2, connecting the cleaning fluid source 506 to the system. Shutoff solenoids 538, 508, 540 and 516 are opened. Shutoff solenoid 542 is also opened to clean check valve 523, and shutoff solenoid 534 is opened to maintain atmospheric pressure in the freezing chamber 18. A pump 507 transfers the cleaning fluid, such as chlorine, through all of the tubing lines and mixing block 30 into the freezing chamber 18. When the liquid level sensor 536 senses the freezing chamber 18 is half full, the pump 507 shuts off and shutoff solenoid 534 closes. Beater bars located inside the freezing chamber 18 turn on to clean all surfaces of the freezing chamber 18. The drain cycle described above then repeats to drain the cleaning fluid from the freezing chamber 18.

The final step in the process is to rinse the cleaning fluid out of the freezing chamber 18 and all of the tubing. Depending on the type of cleaning solution used, the rinse may not be necessary, or additional rinse cycles may be necessary. The two-way solenoid 504 moves to position 2. Shutoff solenoids 538, 508, 540 and 516 are opened, as well as shutoff solenoid 542 to rinse check valve 523. Shutoff solenoid 534 is opened to maintain atmospheric pressure in the freezing chamber 18. The water pump 512 transfers water through the tubing and mixing block 30 to the freezing chamber 18, and when the freezing chamber 18 is half full as determined by liquid level sensor 536, the water pump 512 shuts off and shutoff solenoid 534 is closed. The beater bars inside the freezing chamber 18 are activated to rinse the freezing chamber 18, and the drain cycle described above again repeats to drain the rinse water from the freezing chamber 18. Normal operation may then resume.

FIG. 14 illustrates an embodiment of the dispensing valve 80 suitable for use with the frozen beverage machine 200 shown in FIGS. 6 and 7. The freezing chamber 18 shown, for example, in FIG. 7 has a dispensing valve 80 coupled thereto for dispensing the frozen beverage from the machine as desired by a user. Aspects of the dispensing valve 80 are similar to those of valves disclosed in U.S. Pat. No. 6,189, 745 by J. I. Frank, the entire specification of which is incorporated by reference herein. The valve 80 employed in the embodiment illustrated in FIG. 17 uses a side-to-side actuation.

Referring to FIG. 14, the valve 80 includes a nozzle 82 that defines an outlet 84 through which the beverage mixture exits the frozen beverage machine 200. The nozzle 82 is received within a valve body 86. The nozzle 82 defines chevron-shaped notches 88 that receive corresponding pins 90 that extend through openings 92 in the valve body 86. A handle 94 is connected to a decorative cover 96, which is in turn connected to the nozzle 82. Moving the handle 94 side-to-side (in or out of the paper as shown in FIG. 14) thus results in the notches 88 riding up on the pins 90, moving the nozzle 82 upwards, or further into the valve body 86.

The upward movement of the nozzle 82 displaces a valve stem 98 from a valve seat 100, allowing the beverage mixture to flow from the freezing chamber into an inlet 102, and through bores defined by the valve body 86 and nozzle 82. The beverage mixture flowing through the valve displaces a diffuser 104 that is biased against the nozzle 82 by a spring 106. The beverage mixture then flows around the diffuser 104, through the spring 106 and out of the valve 80 through the outlet 84.

The chevron-shaped notches 88 allow opening the valve 80 by moving the handle 94 side-to-side in either direction. In an alternative embodiment, the valve body 86 and nozzle 82 are cooperatively threaded, such that moving the handle 94 in a first direction opens the valve, and moving it in a second direction closes the valve.

Most components of the valve assembly are typically constructed from stainless steel. As the stainless steel parts are in direct contact with the refrigerated freezing chamber, the valve stays cold, retarding the growth of contaminates. Further, a rotary actuated device, such as a rotary solenoid, may be employed to make the valve 80 an automated valve.

The nozzle 82 and nozzle area require frequent sanitation. To facilitate this, the openings 92 through which the pins 90 extend are threaded to receive correspondingly threaded portions 110 of the nut 112. Hence, the valve is so designed that threaded couplers 112 located on either side of the valve can be turned to remove the pins 90 from the notches 88, thus easily and quickly releasing the nozzle 82 from the valve body 86 for frequent and simple cleaning.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified and all such variations are considered within the scope and spirit of the invention.

What is claimed is:

1. A frozen beverage machine, comprising:
   a process control block having a plurality of inlets for receiving ingredients and a plurality of outlets, the process control block including a flow control device for controlling the flow of ingredients therethrough;
   a mixing block connected to the freezing chamber such that the mixing block is chilled via thermal communication with the freezing chamber, the mixing block having a plurality of inlets and an outlet, the mixing block inlets being connected to the process control block outlets such that ingredients flowing through the mixing block are mixed together;
   at least one freezing chamber connected to the mixing block outlet to receive the mixed ingredients therefrom;
   a refrigeration system arranged to refrigerate the at least one freezing chamber;
   a controller connected to the process control block, the controller operable to control operation of the frozen beverage machine; and
   a dispensing valve connected to the freezing chamber.

2. The frozen beverage machine of claim 1, wherein the controller is further programmed to automatically sanitize the frozen beverage machine.

3. The frozen beverage machine of claim 1, further comprising a plurality of check valves, each of the mixing block inlets having one of the check valves coupled thereto.

4. The frozen beverage machine of claim 1, wherein at least one of the mixing block inlets is connected to a source of a cleaning fluid.

5. The frozen beverage machine of claim 4, further comprising a compartment for stowing the source of cleaning solution.

6. The frozen beverage machine of claim 4, wherein the source of cleaning solution comprises at least one bag for holding a volume of the cleaning solution, each bag situated in a respective box.

7. The frozen beverage machine of claim 1, further comprising a static mixer situated at the outlet of the mixing block.

8. The frozen beverage machine of claim 1, further comprising a pressure transducer connected to the mixing block to sense the pressure in the freezing chamber.

9. The frozen beverage machine of claim 8, wherein the controller receives an output of the pressure transducer, and wherein the controller is programmed to control refrigeration of the freezing chamber in response to the pressure of the freezing chamber.

10. The frozen beverage machine of claim 1, further comprising a pump connected between the source of cleaning solution and the mixing block to pump the cleaning solution into the mixing block.

11. The frozen beverage machine of claim 1, further comprising a drain valve assembly attached to the freezing chamber for draining the contents thereof.

12. The frozen beverage machine of claim 11, further comprising a source of compressed air connected to the drain valve assembly, wherein the drain valve assembly is air-operated.

13. The frozen beverage machine of claim 11, wherein the controller is programmed to operate the drain assembly.

14. The frozen beverage machine of claim 12, wherein the source of compressed air is further connected to the mixing block.

15. The frozen beverage machine of claim 12, wherein the source of compressed air comprises an air compressor.

16. The frozen beverage machine of claim 12, wherein the source of compressed air comprises an air tank.

17. The frozen beverage machine of claim 1, further comprising a vent valve assembly connected to the freezing chamber.

18. The frozen beverage machine of claim 1, further comprising a water pump for pumping water to the mixing block.

19. The frozen beverage machine of claim 1, further comprising a compartment refrigerated by the refrigeration system for storing the ingredients.

20. The frozen beverage machine of claim 1, wherein the dispensing valve comprises:

a valve body a nozzle releasably connected to the valve body such that the nozzle is rotatable in first and second directions within the valve body; and a handle connected to the nozzle, the nozzle actuated by side-to-side motion of the handle, wherein the valve is actuated by moving the handle in either ther first or direction.

21. The frozen beverage machine of claim 20, wherein the nozzle defines a chevron-shaped notch and the valve body defines a bore extending therethrough, and wherein a pin extends through the bore and seats in the chevron-shaped notch such that the chevron-shaped notch rides on the pin when the nozzle is rotated by the handle.

22. A frozen beverage machine, comprising:

a process control block having a plurality of inlets for receiving ingredients and a plurality of outlets, the process control block including a flow control device for controlling the flow of ingredients therethrough;

mixing block having a plurality of inlets and an outlet, the mixing block inlets being connected to the process control block outlets such that ingredients flowing through the mixing block are mixed together;

a plurality of check valves, each of the mixing block inlets having one of the check valves coupled thereto;

at least one freezing chamber connected to the mixing block outlet to receive the mixed ingredients therefrom;

a refrigeration system arranged to refrigerate the at least one freezing chamber;

a controller connected to the process control block, the controller operable to control operation of the frozen beverage machine; and a dispensing valve connected to the freezing chamber.

23. A frozen beverage machine comprising:

a process control block having a plurality of inlets for receiving ingredients and a plurality of outlets, the process control block including a flow control device for controlling the flow of ingredients therethrough;

a mixing block having a plurality of inlets and an outlet, the mixing block inlets being connected to the process control block outlets such that ingredients flowing through the mixing block are mixed together;

at least one freezing chamber connected to the mixing block outlet to receive the mixed ingredients therefrom;

at least one bag for holding a volume of a cleaning solution, each bag situated in a respective box, at least one of the mixing block inlets being connected to the bag;

a refrigeration system arranged to refrigerate the at least one freezing chamber;

a controller connected to the process control block, the controller operable to control operation of the frozen beverage machine; and a dispensing valve connected to the freezing chamber.

24. A frozen beverage machine, comprising:

a process control block having a plurality of inlets for receiving ingredients and a plurality of outlets, the process control block including a flow control device for controlling the flow of ingredients therethrough;

a mixing block having a plurality of inlets and an outlet, the mixing block inlets being connected to the process control block outlets such that ingredients flowing through the mixing block are mixed together, a static mixer situated at the outlet of the mixing block;

at least one freezing chamber connected to the mixing block outlet to receive the mixed ingredients therefrom;

a refrigeration system arranged to refrigerate the at least one freezing chamber;

a controller connected to the process control block, the controller operable to control operation of the frozen beverage machine; and a dispensing valve connected to the freezing chamber.

25. A frozen beverage machine, comprising:

a process control block having a plurality of inlets for receiving ingredients and a plurality of outlets, the process control block including a flow control device for controlling the flow of ingredients therethrough;

a mixing block having a plurality of inlets and an outlet, the mixing block inlets being connected to the process control block outlets such that ingredients flowing through the mixing block are mixed together;

at least one freezing chamber connected to the mixing block outlet to receive the mixed ingredients therefrom;

a refrigeration system arranged to refrigerate the at least one freezing chamber;

a pressure transducer connected to the mixing block to sense the pressure in the freezing chamber;

a controller connected to the process control block, the controller operable to control operation of the frozen beverage machine, wherein the controller receives an output of the pressure transducer, and wherein the controller is programmed to control refrigeration of the freezing chamber in response to the pressure of the freezing chamber; and a dispensing valve connected to the freezing chamber.

26. A frozen beverage machine, comprising:

a process control block having a plurality of inlets for receiving ingredients and a plurality of outlets, the process control block including a flow control device for controlling the flow of ingredients therethrough;

a mixing block having a plurality of inlets and an outlet, the mixing block inlets being connected to the process control block outlets such that ingredients flowing through the mixing block are mixed together;

at least one freezing chamber connected to the mixing block outlet to receive the mixed ingredients therefrom;

a refrigeration system arranged to refrigerate the at least one freezing chamber;

a controller connected to the process control block, the controller operable to control operation of the frozen beverage machine;

a dispensing valve connected to the freezing chamber;

adrain valve assembly attached to the freezing chamber for draining the contents thereof; and a source of compressed air connected to the drain valve assembly, wherein the drain valve assembly is air-operated.

27. The frozen beverage machine of claim 26, wherein the controller is programmed to operate the drain assembly.

28. The frozen beverage machine of claim 26, wherein the source of compressed air is further connected to the mixing block.

29. The frozen beverage machine of claim 26, wherein the source of compressed air comprises an air compressor.

30. The frozen beverage machine of claim 26, wherein the source of compressed air comprises an air tank.

31. A frozen beverage machine, comprising:
- a process control block having a plurality of inlets for receiving ingredients and a plurality of outlets, the process control block including a flow control device for controlling the flow of ingredients therethrough;
- a mixing block having a plurality of inlets and an outlet, the mixing block inlets being connected to the process control block outlets such that ingredients flowing through the mixing block are mixed together;
- at least one freezing chamber connected to the mixing block outlet to receive the mixed ingredients therefrom;
- a refrigeration system arranged to refrigerate the at least one freezing chamber;
- a controller connected to the process control block, the controller operable to control operation of the frozen beverage machine; and
- a dispensing valve connected to the firing chamber, the dispensing valve including a valve body defining a bore extending therethrough, a nozzle releasably connected to the valve body and defining a chevron-shaped notch, a handle connected to the nozzle, a pin extending through the bore and seated in the chevron-shaped notch such that the chevron-shaped notch rides on the pin when the nozzle is rotated by side-to-side motion of the handle, such that the valve is actuated by moving the handle in either first or second directions.

* * * * *